US012709454B2

(12) United States Patent
Borum et al.

(10) Patent No.: US 12,709,454 B2
(45) Date of Patent: Aug. 18, 2026

(54) SYSTEM AND METHOD FOR PRESSURIZING AND DISPENSING A FOOD PRODUCT

(71) Applicant: KAN-PAK, LLC, Wichita, KS (US)

(72) Inventors: James Michael Borum, Arkansas City, KS (US); Joshua Laine Highland, Winfield, KS (US)

(73) Assignee: KAN-PAK, LLC, Wichita, KS (US)

( * ) Notice: Subject to any disclaimer, the term of this patent is extended or adjusted under 35 U.S.C. 154(b) by 16 days.

(21) Appl. No.: 18/915,792

(22) Filed: Oct. 15, 2024

(65) Prior Publication Data

US 2025/0122000 A1 Apr. 17, 2025

Related U.S. Application Data

(60) Provisional application No. 63/591,048, filed on Oct. 17, 2023.

(51) Int. Cl.

| | |
|---|---|
| ***B65D 83/48*** | (2006.01) |
| ***B05B 7/10*** | (2006.01) |
| ***B65D 83/38*** | (2006.01) |

(52) U.S. Cl.
CPC ................ *B65D 83/48* (2013.01); *B05B 7/10* (2013.01); *B65D 83/38* (2013.01)

(58) Field of Classification Search
CPC ....... B65D 83/48; B65D 83/38; B65D 83/384
See application file for complete search history.

(56) References Cited

U.S. PATENT DOCUMENTS

| | | | | |
|---|---|---|---|---|
| 2,372,392 A | | 3/1945 | Pletman | |
| 2,612,293 A | * | 9/1952 | Michel | B65D 83/46 220/915 |
| 4,958,755 A | * | 9/1990 | Gerstung | B65D 83/46 222/402.23 |
| 5,089,178 A | | 2/1992 | Passoni | |
| 5,135,137 A | | 8/1992 | Rudick | |
| 5,553,755 A | * | 9/1996 | Bonewald | B65D 83/20 222/402.23 |
| 6,113,070 A | * | 9/2000 | Holzboog | B65D 83/38 239/597 |
| 7,100,799 B2 | | 9/2006 | Gruenewald et al. | |

(Continued)

OTHER PUBLICATIONS

International Search Report and Wrotten Opinion issued in PCT Application No. PCT/US2024/051358, mailed Jan. 27, 2025, in 16 pages.

*Primary Examiner* — Khaled Annis
(74) *Attorney, Agent, or Firm* — Knobbe, Martens, Olson & Bear, LLP

(57) ABSTRACT

A system for pressurizing and dispensing a food product can include a pouch for storing the food product, a dispensing valve coupled to the pouch, and a canister for holding the pouch. The pouch can include a valve fitment for attachment to the dispensing valve. The dispensing valve can include a first valve body portion moveably coupled to a second valve body portion. The first valve body portion can include a piston coupled to a nozzle portion. The dispensing valve can be manually manipulated between an open position and a closed position by axially translating the piston within the second valve body portion. The nozzle portion may be used to both charge the pouch with pressurized gas and dispense the food product.

20 Claims, 13 Drawing Sheets

(56) References Cited

U.S. PATENT DOCUMENTS

| | | | | |
|---|---|---|---|---|
| 2009/0212071 | A1* | 8/2009 | Tom | B65B 31/003 222/105 |
| 2015/0360830 | A1 | 12/2015 | Niggemyer | |
| 2016/0031612 | A1* | 2/2016 | Fore | B65D 83/46 251/319 |
| 2016/0095756 | A1* | 4/2016 | Zurovcik | A61B 50/30 604/319 |
| 2018/0273221 | A1 | 9/2018 | Guo et al. | |
| 2019/0185251 | A1* | 6/2019 | Plaschkes | B65D 83/62 |
| 2021/0024280 | A1 | 1/2021 | Cassoni et al. | |
| 2021/0229121 | A1* | 7/2021 | Luckow | B05B 15/16 |
| 2023/0174293 | A1* | 6/2023 | Sugawara | B65D 77/04 222/94 |
| 2024/0158596 | A1* | 5/2024 | Donaldson | A61K 9/0014 |
| 2025/0122000 | A1* | 4/2025 | Borum | A47J 43/128 |

* cited by examiner

SYSTEM AND METHOD FOR PRESSURIZING AND DISPENSING A FOOD PRODUCT

INCORPORATION BY REFERENCE TO ANY PRIORITY APPLICATIONS

This application claims the benefit of U.S. Provisional Patent Application No. 63/591,048, filed Oct. 17, 2023, which is incorporated by reference herein in its entirety.

BACKGROUND

Field

The present disclosure relates generally to systems and methods for pressurizing and dispensing a food product. More particularly, the present disclosure relates to systems and methods for dispensing whipped cream and other aseptic packaged food products.

Description of the Related Art

Whipped cream and other cream-based food products are widely used in the preparation of drinks, desserts, and other foods. Whipped cream dispensers require pressurized gas, such as nitrogen, to whip and dispense cream through a nozzle, creating an emulsified foam.

Due to eventual spoilation, the refrigerated cream that is stocked by many restaurants has a relatively limited shelf life. Aseptically packaging food products eliminates the need for refrigeration. Food products, such as cream, can be aseptically stored by first undergoing commercial sterilization. The sterilized food product is then filled into and sealed within a sterilized package. Since the food product and the package have both been sterilized, the food product is shelf-stable and does not require refrigeration. Thus, aseptic shelf-stable cream has an extended shelf life relative to conventional refrigerated cream.

SUMMARY

The systems, methods, and devices described herein have innovative aspects, no single one of which is indispensable or solely responsible for their desirable attributes. Without limiting the scope of the claims, some of the advantageous features will now be summarized.

Generally, the present disclosure provides, among other things, a pressurization and dispensing system. The disclosed dispensing system may be used in various contexts to dispense various pressurized substances (e.g., food products, beauty products, construction products). More specifically, the present disclosure provides a system and method for pressurizing and dispensing a food product, such as whipped cream. Conventional whipped cream dispensers possess various drawbacks.

One such drawback of conventional whipped cream dispensers is the need to clean them. Because the canister, nozzle, and other components come in contact with food products, these components need to be regularly cleaned to prevent bacterial growth. Preparation of a conventional whipped cream dispenser for reuse is a time intensive and inconvenient process involving disassembling the dispenser, cleaning the components, reassembling the dispenser, filling the canister with cream, charging the canister, and chilling the dispenser. As a result, many restaurants have resorted to stocking multiple whipped cream dispensers and preparing them the night before in order to avoid the inconvenience of cleaning and refilling a single dispenser during service hours.

The present disclosure, among other things, provides improvements to whipped cream dispensers. In certain aspects, the present disclosure provides a dispensing system including a pouch for storing cream. The pouch can be inserted into a canister, allowing for use of aseptically packaged cream. Moreover, a disposable pouch and/or dispensing valve can be used to eliminate the lengthy cleaning process associated with conventional whipped cream dispensers. In certain aspects, the present disclosure provides a dispensing valve including a nozzle which is adapted to couple to a source of pressurized gas and receive an intake of pressurized gas. The nozzle may be used to both dispense whipped cream and charge the pouch, resulting in greater case of use and lower manufacturing costs. In other implementations the pouch may have separate ports for receiving pressurized gas and dispensing a food product.

The present disclosure, among other things, provides a system and method for pressurizing and dispensing a food product. The system for pressurizing and dispensing a food product can include a pouch configured to contain the food product and a dispensing valve couple to the pouch. The pouch can include an opening into its interior and a valve fitment coupled to the opening. The dispensing valve can include a first valve body portion. The first valve body portion can include a nozzle portion, a piston coupled to the nozzle portion, an interior channel, and/or a first valve port. The nozzle portion can include a fluid outlet. The piston can be integrally formed with or separately coupled to the nozzle portion. The interior channel extends axially within the first valve body portion from the piston to the fluid outlet. The first valve port extends through a wall of the interior channel proximal to the piston. The piston can axially translate between a closed position in which the interior channel is not in fluid communication with the interior of the pouch and an open position in which the interior channel is in fluid communication with the interior of the pouch.

In certain aspects, the system can include a canister configured to contain the pouch. The canister can include a canister base and a canister lid coupled to the canister base. The canister lid can include a lid opening configured to receive the valve fitment. An interior volume of the canister can be less than an interior volume of the pouch. The canister can be configured to contain the pouch in a pressurized state. The canister can be opaque or translucent.

The system can include a second valve body portion moveably coupled to the first valve body portion. The second valve body portion can include an attachment end configured to couple to the valve fitment and an actuator end disposed opposite the attachment end. The second valve body portion can include a valve chamber extending axially therethrough. The valve chamber can be in fluid communication with the interior of the pouch when the pouch is coupled to the dispensing valve. The piston can be disposed within the valve chamber proximal to the actuator end. The piston can axially translate within the valve chamber.

The system can include one or more valve seals. For example, the system can include a first valve seal coupled to an end of the piston distal to the fluid outlet. The system can include a second valve seal coupled to the piston. In some configurations, the second valve seal can be disposed such that the first valve port is positioned between the first valve seal and the second valve seal.

The system can include a surface extending radially outward from the first valve body portion configured to allow a user to manually translate the piston between the open position and the closed position. The surface can be shaped to comprise an annular disk or any other shape.

The dispensing valve can be configured to removably couple to the pouch. For example, The attachment end can be configured to removably couple to the valve fitment.

The nozzle portion can have a substantially constant outer diameter. The fluid outlet can include a forked tip. The interior channel can have a constant or non-constant diameter along its length. For example, the interior channel can increase in diameter from a small diameter proximal to the piston to a larger diameter at the fluid outlet. The nozzle portion can be configured to removably couple to a source of pressurized gas and receive an intake of pressurized gas.

The piston can have an increased diameter at an end distal to the fluid outlet. The piston can be configured to default to the closed position when the pouch is in a pressurized state.

The dispensing valve can be disposable.

The pouch can be aseptic. The pouch can comprise a flexible material. The pouch can be configured to be pressurized. The pouch can be disposable.

The piston and the nozzle portion can be formed as a single integral component.

The system can further comprise a handle portion coupled to the cannister and the first valve body portion, wherein the handle portion is depressible to move the first valve body portion towards the cannister.

In other aspects, the disclosure provides a dispensing valve for receiving pressurized gas from a source of pressurized gas and dispensing whipped cream from a pouch. The dispensing valve can include a first valve body portion moveably coupled to a second valve body portion. The first valve body portion can include a nozzle, a piston coupled to the nozzle, an interior channel, and/or a valve port. The nozzle portion can include a fluid outlet. The nozzle portion can be configured to couple to the source of pressurized gas and receive an intake of pressurized gas. The interior channel extends axially within the first valve body portion from the piston to the fluid outlet. The first valve port extends through a wall of the interior channel proximal to the piston. The second valve body portion can include an attachment end configured to be attached to the pouch and an actuator end disposed opposite the attachment end. The second valve body portion can include a valve chamber extending axially therethrough. The piston can axially translate within the valve chamber between a closed position in which the interior channel is not in fluid communication with the valve chamber and an open position in which the interior channel is in fluid communication with the valve chamber.

In certain aspects, the dispensing valve can include a pouch coupled to the dispensing valve and configured to contain the food product. The pouch can include an opening into an interior of the pouch and a valve fitment coupled to the opening. The valve chamber can be in fluid communication with the interior of the pouch when the pouch is coupled to the dispensing valve.

In certain aspects, the dispensing valve can include a canister configured to contain the pouch. The canister can include a canister base and a canister lid coupled to the canister base. The canister lid can include a lid opening configured to receive the valve fitment.

The system can include one or more valve seals. For example, the dispensing valve can include a first valve seal coupled to an end of the piston distal to the nozzle portion. The dispensing valve can include a second valve seal coupled to the piston. In some configurations, the second valve seal can be disposed such that the first valve port is positioned between the first valve seal and the second valve seal.

The dispensing valve can include a surface extending radially outward from the first valve body portion configured to allow a user to manually translate the piston between the open position and the closed position. The surface can be shaped to comprise an annular disk or any other shape.

The dispensing valve can be configured to removably couple to the pouch. For example, the attachment end can be configured to removably couple to the valve fitment.

The nozzle portion can have a substantially constant outer diameter, the interior channel can have a constant or non-constant diameter along its length. For example, the interior channel can increase in diameter from a small diameter proximal to the piston to a larger diameter at the fluid outlet.

The piston can have an increased diameter at an end distal to the fluid outlet. The piston can be configured to default to the closed position when the pouch is in a pressurized state.

The dispensing valve can be disposable.

The piston and the nozzle portion can be formed as a single integral component.

The dispensing valve can further comprise a handle portion coupled to the cannister and the first valve body portion, wherein the handle portion is depressible to move the first valve body portion towards the cannister.

In other aspects, the disclosure provides a method for pressurizing and dispensing a food product. The method can include the steps of connecting a source of pressurized gas to a nozzle portion of a dispensing valve coupled to a pouch containing the food product and manipulating the dispensing valve to an open position in which the nozzle portion is in fluid communication with an interior of the pouch. The method can additionally include the steps of charging the pouch with pressurized gas via the nozzle portion and manipulating the dispensing valve to a closed position in which the nozzle portion is not in fluid communication with the interior of the pouch. The method can additionally include the steps of detaching the source of pressurized gas from the nozzle portion and shaking the pouch to mix the food product with the pressurized gas. The method can additionally include the steps of manipulating the dispensing valve to the open position in which the nozzle portion is in fluid communication with the interior of the pouch and dispensing the food product via the nozzle portion.

In certain aspects, manipulating the dispensing valve can include moving a first valve body portion axially relative to a second valve body portion. For example, moving the first valve body portion axially relative to the second valve body portion can include axially translating a piston coupled to the first valve body portion within a valve chamber disposed within the second valve body portion.

The method can include placing the pouch into a canister prior to charging the pouch with pressurized gas via the nozzle portion.

The food product can be cream to be dispensed as whipped cream. The cream can comprise any percentage of fat. The cream can be pure cream or cream with added ingredients, such as flavoring and sugar. The food product can be a dairy-based food product, a non-dairy food product, or a dairy alternative food product. The food product can be any liquid that can be whipped or foamed, such as cocoa, cream cheese, caramel, etc. The food product can be dispensed in a whipped or foamed state. The pressurized gas can be nitrogen, or any other gas. The source of pressurized gas can be a gas cartridge, a gas tank, or any other pressurized gas vessel.

BRIEF DESCRIPTION OF THE DRAWINGS

The features and advantages of the methods and systems described herein will become more fully apparent from the following description and appended claims, taken in conjunction with the accompanying drawings. These drawings depict only several embodiments in accordance with the disclosure and are not to be considered limiting of its scope. In the drawings, similar reference numbers or symbols typically identify similar components, unless context dictates otherwise. In some instances, the drawings may not be drawn to scale.

DETAILED DESCRIPTION

Figure 1:
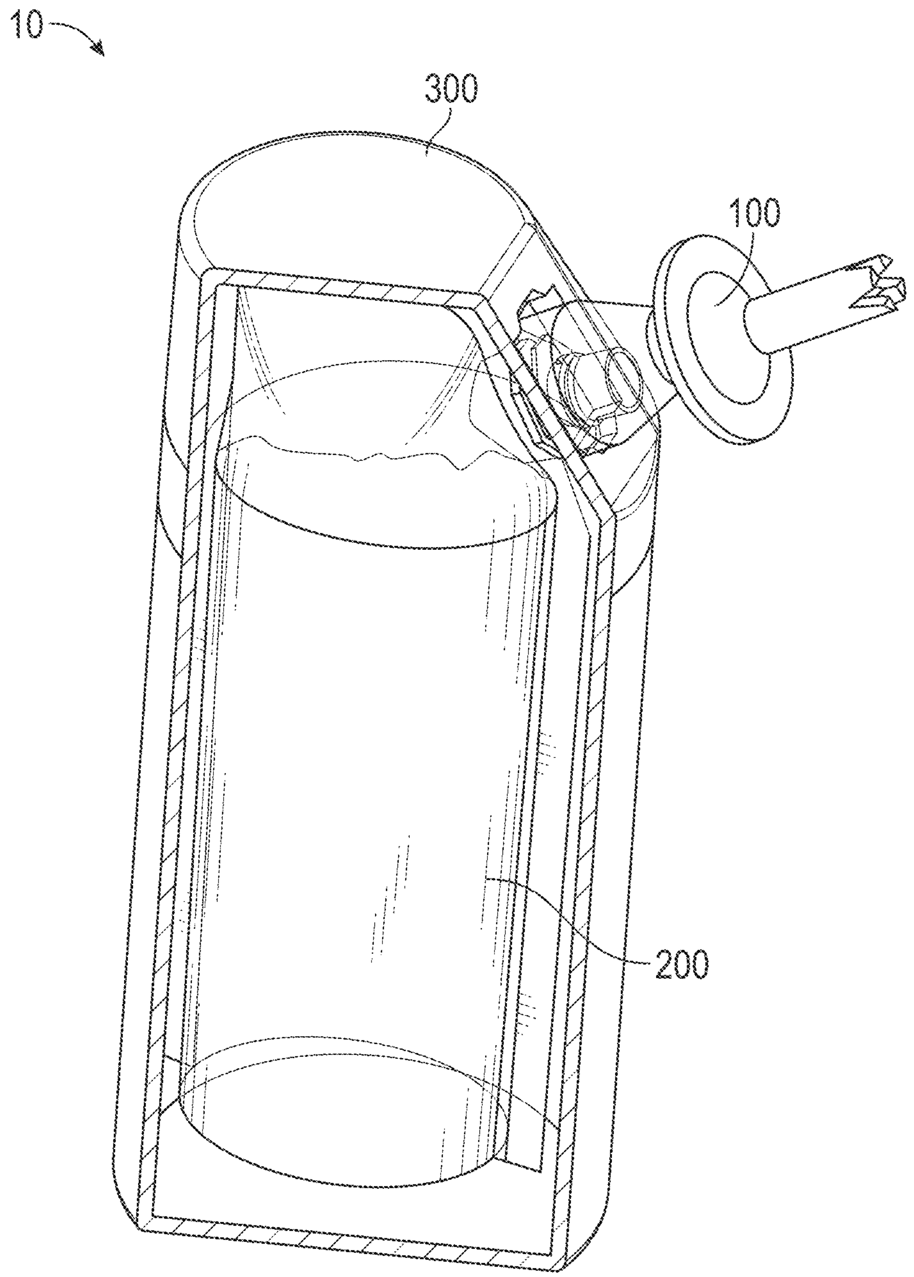
FIG. 1 depicts a perspective view of a system for pressurizing and dispensing a food product comprising a pouch, a dispensing valve, and a canister.
Figure 1A:
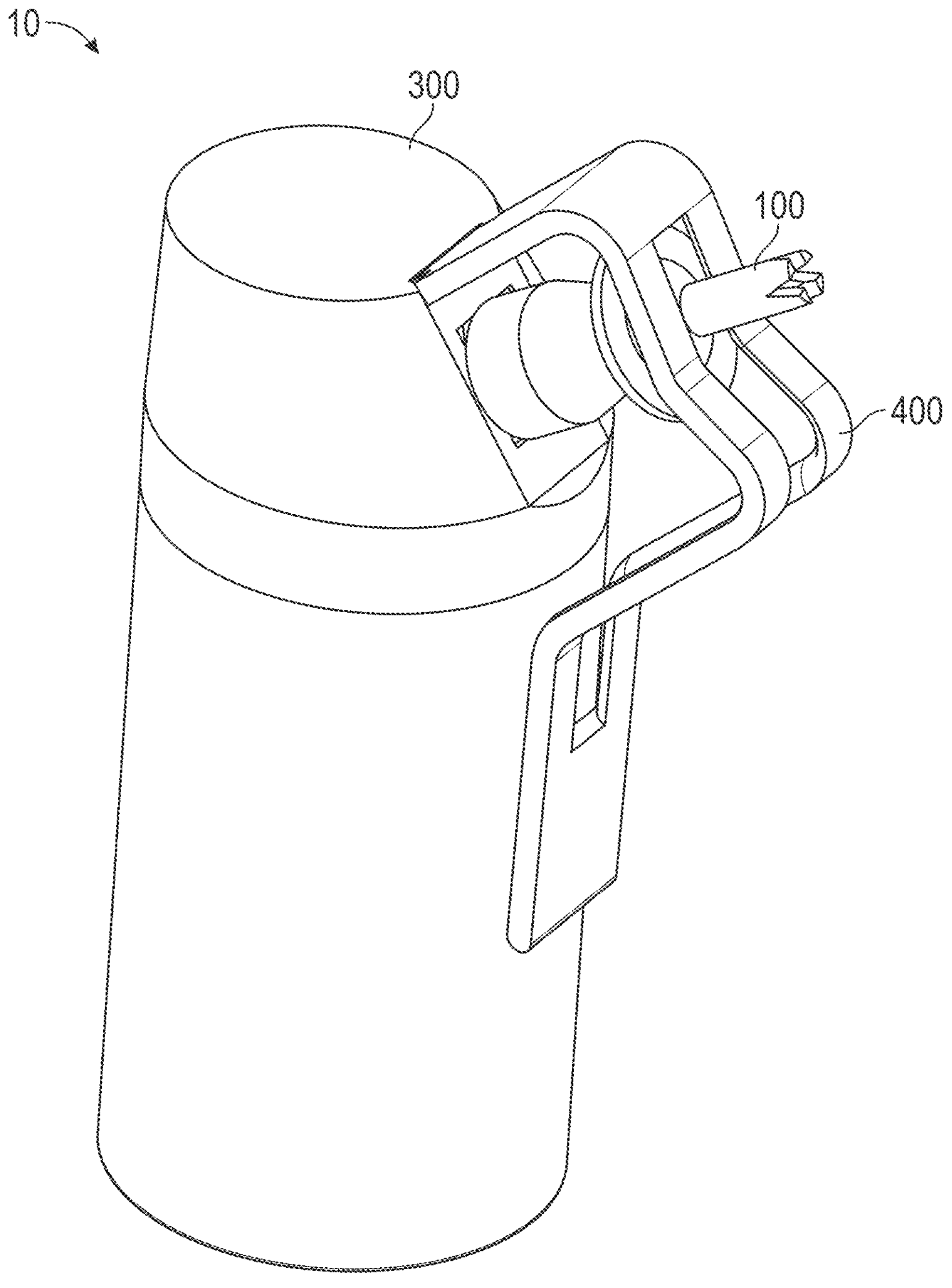
FIG. 1A depicts a perspective view of a system for pressurizing and dispensing a food product comprising a handle.
Figure 2:
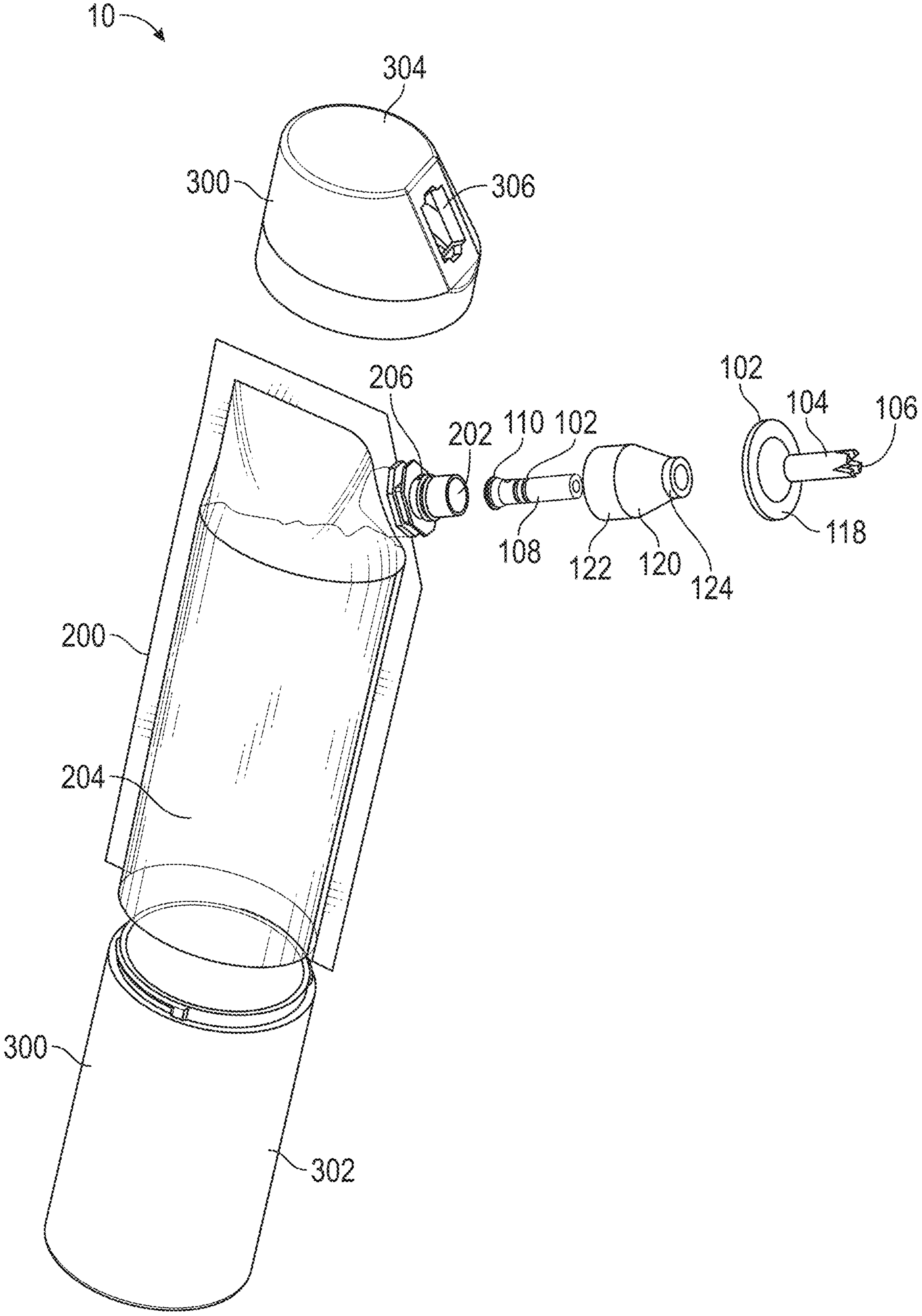
FIG. 2 depicts an exploded view of the system for dispensing a food product shown in FIG. 1.

FIGS. 1-2 depict an example system 10 for pressurizing and dispensing a food product. FIG. 1 depicts a cutaway of the system 10 in an assembled state. FIG. 2 depicts an exploded view of example components of the system 10. The system 10 can comprise a pouch 200, a dispensing valve 100, and/or a canister 300. As shown by FIG. 1A, the system can optionally comprise a handle portion 400 for operating the dispensing valve 100. In use, the pouch 200 and/or dispensing valve 100 may be disposable, while the canister 300 is reusable. In other scenarios, the dispensing valve 100 may be reusable.

As shown in FIG. 2, The canister 300 may comprise a canister base 302 and a canister lid 304. The canister base 302 may be an elongated cylinder with an opening at one end for inserting the pouch 200 into the canister 300. In other embodiments, the canister 300 may form any shape suitable for containing a pouch 200 in its interior volume. An attachment mechanism can be disposed proximal to the opening of the canister base 302 for coupling the canister lid 304 to the canister base 302. The canister lid 304 may be removably coupled or non-removably coupled to the canister base 302. The canister lid 304 may be coupled to the canister base 302 via threading, a latch, or any other suitable attachment mechanism for coupling objects together. A closed interior volume may be formed when the canister lid 304 is coupled to the canister base 302. The canister 300 is configured to contain the pouch 200 within its interior volume. Other canister arrangements are possible. For example, the canister lid 304 may form a bottom portion of the canister 300 and any of the canister lid 304 features described herein may be disposed in the canister base 302. In another example, the canister 300 can include three or more components configured to be removably coupled to each other.

As shown in FIG. 2, a lid opening 306 may be formed in the canister lid 304. The lid opening 306 may be dimensioned to receive at least a portion of the pouch 200 and/or dispensing valve 100. For example, the lid opening 306 may be dimensioned to interface with a valve fitment 206 on the pouch 200. When the pouch 200 is placed inside the canister 300, the valve fitment 206 may protrude out of the lid opening 306 to allow for actuation of the dispensing valve 100 from the exterior of the canister 300. In the illustrated configuration, the lid opening 306 is formed in an angled surface of the canister lid 304. But in other configurations, the lid opening 306 may be formed in a top surface of the canister lid 304 or any other surface of the canister lid 304 or canister base 302.

The canister 300 can be configured to contain the pouch 200 when the pouch 200 is in a pressurized state. For instance, the interior volume of the canister 300 may be less than the interior volume of the pouch 200 to ensure that the canister 300 bears the pressure load of a pressurized pouch 200. When used in conjunction with the canister 300, the pouch 200 may be made from a flexible material that would not otherwise be able to withstand pressurization of the interior 204 of the pouch 200. The canister 300 may be opaque or may be partially or wholly translucent or transparent to enable a user to see the amount of food product within the pouch 200. The canister 300 may be composed of any suitable material such as metal, plastic, polymer, wood, ceramic, or the like. The canister 300 may be rigid or flexible.

As shown in FIG. 2, the pouch 200 defines an interior 204 which is fillable with a food product. The food product may be cream, cheese, or other foam-based foods or non-food substances. The pouch 200 may be configured to be coupled to the dispensing valve 100. The pouch 200 may comprise a valve fitment 206 coupled to an opening 202 into the interior 204 of the pouch 200. The pouch 200 may be coupled to the dispensing valve 100 via the valve fitment 206. The pouch 200 may be removably or non-removably coupled to the dispensing valve 100. The valve fitment 206 may comprise threading for twisting the dispensing valve 100 onto the valve fitment 206. In other embodiments, the pouch 200 may be coupled to the dispensing valve 100 via a latch, glue, material bonding, or any other means for coupling objects together. In other embodiments, the pouch 200 may include more than one opening 202. For instance, the pouch 200 may include two or more openings 202, wherein one opening 202 can function as a food product outlet and another opening 202 can function as a pressurized gas inlet. In some embodiments, an opening 202 used as a food product outlet can be coupled to a dispensing valve 100, and an opening 202 used as a pressurized gas inlet can be coupled to a port configured to receive pressurized gas from a source of pressurized gas.

As shown in FIG. 2, the valve fitment 206 may additionally comprise a tubular body extending from the opening 202 in the pouch 200. The valve fitment 206 may be disposed on the pouch 200 at a substantially 45-degree angle relative to a longitudinal length of the pouch 200. The position of the valve fitment 206 is not critical and may vary depending on the particular dispensing application. In other embodiments, the valve fitment 206 may be positioned at any location on the pouch 200 and at any angle therefrom.

The pouch 200 may be configured to be pressurized by receiving an intake of pressurized gas into the interior 204 of the pouch 200. The pouch 200 may be configured to independently withstand pressurization. In other embodiments, the pouch 200 may not be able to independently withstand pressurization and may need to be placed into a canister 300 prior to pressurization. The pouch 200 may be composed of any material suitable for storing a liquid or semi-liquid food product such as plastic film, rubber, polymers, or the like. The pouch 200 may be made from a flexible material. The pouch 200 may be an aseptic pouch 200. For instance, the pouch 200 may be an aseptic pouch 200 configured to store shelf stable cream. The pouch 200 may be disposable. The pouch 200 may be reusable.

As shown in FIG. 2, the dispensing valve 100 may comprise a first valve body portion 102 moveably coupled to a second valve body portion 120. In other embodiments, the dispensing valve 100 may only comprise a first valve body portion 102. The dispensing valve 100 may be manipulated between a closed position and an open position by moving the first valve body portion 102 axially relative to the second valve body portion 120. The dispensing valve 100 may be configured to receive an intake of pressurized gas and dispense a food product via a single nozzle portion 104. The dispensing valve 100 may be configured to be coupled to the pouch 200. When the pouch 200 is disposed within the canister 300 and the dispensing valve 100 is coupled to the pouch 200, the dispensing valve 100 may protrude from the lid opening 306 to allow for manual manipulation of the dispensing valve 100 by a user. The dispensing valve 100 may be disposable and thrown out after a single use, or it may be reusable.

As an example, the system 10 may be utilized to pressurize and dispense a food product, such as whipped cream. The system may be configured and dimensioned to be used as a handheld device. The process may begin with obtaining a pouch 200 that has been prefilled with cream. The pouch 200 may be an aseptic pouch 200 for storing shelf-stable cream. For instance, a supplier may supply a restaurant with prefilled aseptic packages of cream. In other scenarios, the end user may obtain an empty pouch 200 and fill it with cream themselves. If a prefilled pouch 200 is used, a dispensing valve 100 may or may not be coupled to the pouch 200 by the supplier. A supplier may supply a restaurant with a prefilled pouch 200 connected to a dispensing valve 100. The pouch 200 and dispensing valve 100 may be designed to be disposable such that they are thrown out after the cream within the pouch 200 has been expended.

In order to whip the cream as it exits the dispenser, the pouch 200 must be charged with a pressurized gas. The user can attach a source of pressurized gas to the nozzle portion 104 of a dispensing valve 100. The user can then manipulate the dispensing valve 100 to the open position to allow the pressurized gas to flow through the dispensing valve 100 and into the interior 204 of the pouch 200. Once the pouch 200 is sufficiently charged with pressurized gas, the user can manipulate the dispensing valve 100 to the closed position (see FIG. 3) and detach the source of pressurized gas from the nozzle. The user can shake the pouch 200 to mix the pressurized gas with the cream.

Once the pouch 200 has been pressurized and shaken, the system 10 is ready to dispense whipped cream. The user can hold the system 10 and point the nozzle portion 104 to a location where whipped cream is desired to be dispensed. The user can then manipulate the dispensing valve 100 to the open position (see FIG. 4) to permit a flow of whipped cream out of the nozzle portion 104. The user may manipulate the dispensing valve 100 between the closed position and the open position by exerting a force on a surface 118 extending from the first valve body. It is to be understood that the system 10 may be utilized for dispensing other substances besides cream. For example, the system 10 may be utilized to dispense any food or non-food substance for which a foam or emulsification is desired to be dispensed.

Figure 3:
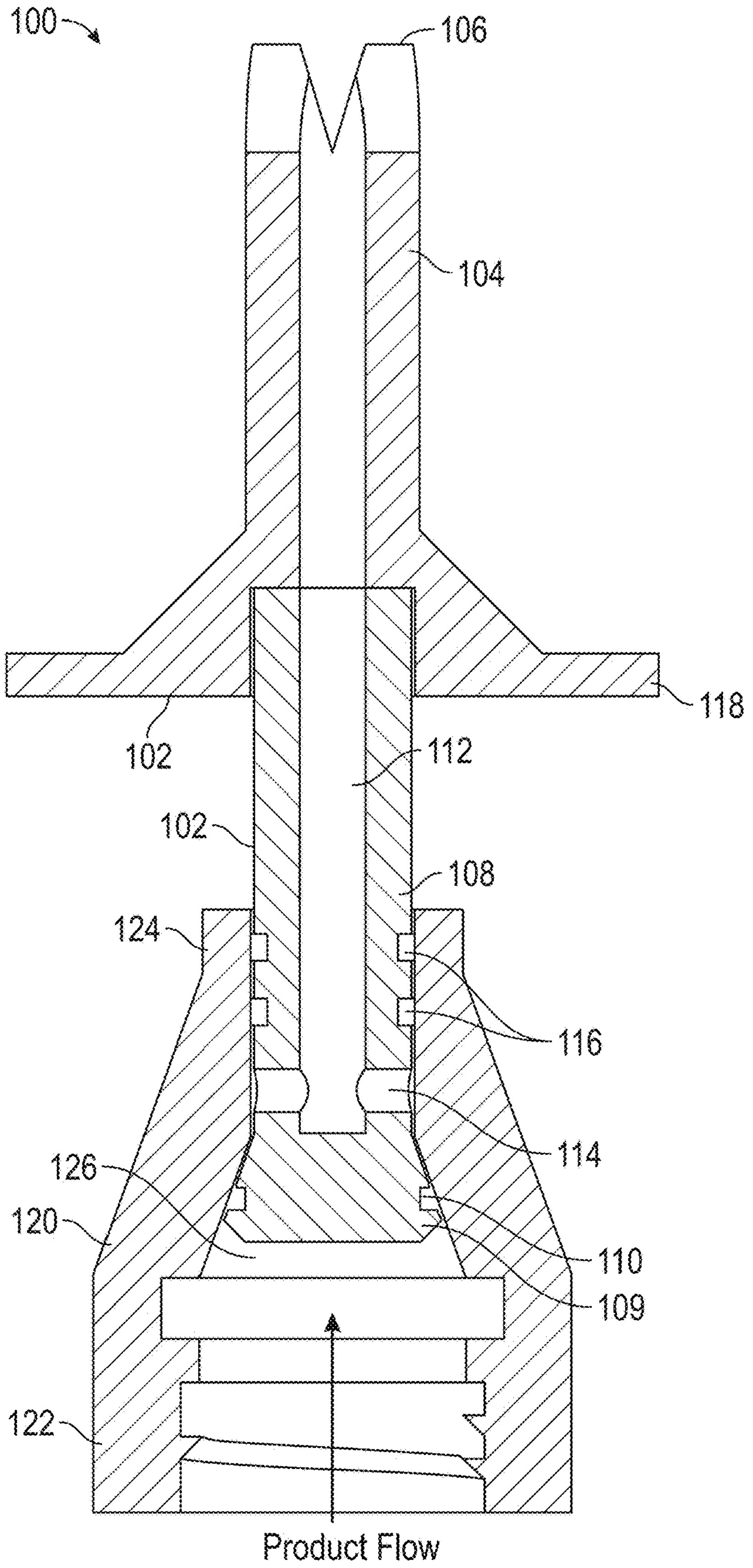
FIG. 3 depicts a cross-sectional view of the dispensing valve shown in FIG. 1 in a closed position.

FIG. 3 depicts a cross-sectional view of the dispensing valve 100 in a closed position. In the closed position, the first valve body portion 102 is positioned relative to second valve body portion 120 such that fluids cannot flow through the dispensing valve 100. The first valve body portion 102 can include a piston 108, a nozzle portion 104, an interior channel 112, and/or a first valve port 114. The piston 108 may form a generally cylindrical shape having a circular cross section. In other configurations, the piston 108 may have a cross-section that is rectangular, triangular, hexagonal, or any other shape. The piston 108 can have a constant diameter along at least a majority of its length or the entire length. The piston 108 can have an increased diameter at its distal end 109. The nozzle portion 104 can be coupled to and axially extend away from the piston 108. The nozzle portion 104 comprises a fluid outlet 106 disposed at an end of the nozzle portion 104 distal to the piston 108. The fluid outlet 106 and the distal end 109 of the piston 108 are disposed on opposing ends of the first valve body portion 102. The fluid outlet 106 may be an opening into the nozzle portion 104. The nozzle portion 104 and the piston 108 may be separate components which are joined together. In other embodiments, the piston 108 and nozzle portion 104 may be manufactured as a single integral component.

As shown in FIG. 3, an interior channel 112 may extend axially along the first valve body portion 102. The interior channel 112 may extend from a position proximal to a distal end 109 of the piston 108 to the fluid outlet 106. The interior channel 112 may have a circular cross section with a substantially constant diameter. In other embodiments, the interior channel 112 may have a rectangular, triangular, hexagonal, or any other shaped cross-section. Additionally, in other embodiments the diameter of the interior channel 112 may not be constant along its axial length. For instance, the diameter of the interior channel 112 may increase from a minimum diameter proximal to the piston 108 to a maximum diameter at the fluid outlet 106.

As shown in FIG. 3, the first valve body portion 102 may include a first valve port 114 extending through a wall of the interior channel 112, such that the first valve port 114 and interior channel 112 are in fluid communication. The first valve port 114 may be located at a position proximal to the piston 108. Specifically, the first valve port 114 may be positioned proximal to the distal end 109 of the piston 108. The first valve port 114 may be any shape, such as a circular hole. Additionally, there may be one, two, three, or more first valve ports 114 positioned radially around the interior channel 112. In some embodiments, there may be two first valve ports 114 extending through opposing surfaces of the interior channel 112. The first valve port 114 may be a circumferential cut-out around the first valve body portion 102.

As shown in FIG. 1, the fluid outlet 106 can have a forked tip characterized by a plurality of triangular cutouts. The forked tip may be configured to permit stylization of the dispensed food product. Specifically, when a food product, such as whipped cream, is dispensed from the fluid outlet 106, the forked tip may be configured to cause the food product to have a star-shaped cross-section. In other embodiments, the fluid outlet 106 may have a differently shaped tip which is configured to stylize the dispensed food product to have a different aesthetic appearance. For instance, the fluid outlet 106 may have a bulbous tip, a conical tip, a rounded tip, or any other shaped tip. Additionally, the fluid outlet 106 may have a tip with triangular cutouts, rectangular cutouts, or any other shaped cutouts.

As shown in FIG. 3, the nozzle portion 104 may have a substantially constant outer diameter along its length. The nozzle portion 104 may be configured to removably couple to a source of pressurized gas in order to receive an intake of pressurized gas. The interior of the pouch 200 may be pressurized by attaching a source of pressurized gas to the nozzle portion 104. Thus, the nozzle portion 104 serves the dual role of being a food product outlet and a pressurized gas inlet, thereby eliminating the need for a separate gas intake nozzle. The nozzle portion 104 may be configured to attach to a gas tank, a gas cartridge, or other forms of pressurized gas vessels. The pressurized gas used to pressurize the pouch 200 may be nitrogen, carbon dioxide, nitrous oxide, or any other gas.

As shown in FIG. 3, the first valve body portion 102 may further comprise one or more valve seals. For example, the first valve body portion 102 may include a first valve seal 110. The first valve seal 110 can be disposed circumferentially around the distal end 109 of the piston 108. The first valve seal 110 functions to prevent fluid flow around the piston 108 and into the first valve port 114 when the dispensing valve 100 is in a closed position. In some embodiments, the valve seal may be an O-ring seal. In other embodiments, the function of the first valve seal 110 may be performed by the distal end 109 of the piston 108 by making circumferential contact with the walls of the valve chamber 126.

As shown in FIG. 3, the first valve body portion 102 may include a second valve seal 116 disposed circumferentially around the piston 108. The second valve seal 116 may be disposed on the piston 108 such that the first valve port 114 is positioned below the second valve seal 116 or intermediate the first valve seal 110 and the second valve seal 116. When the dispensing valve 100 is in an open position, the second valve seal 116 functions to prevent fluid flow around the piston 108 and out of the actuator end 124. The second valve seal 116 may be an O-ring seal, an integral protrusion extending from the piston 108, or any other suitable sealing mechanism. In some embodiments, additional valve seals may be disposed along the piston 108.

As shown in FIG. 3, the first valve body portion 102 may further comprise a surface 118 extending radially outward from the first valve body portion 102 configured to allow a user to manually translate the dispensing valve 100 between the open position and the closed position. The surface 118 may form the shape of an annular disk. In other embodiments, the surface 118 may form any other shape. To operate the dispensing valve 100, the user may place their fingers over the surface 118 and exert a force on the surface 118 to depress the first valve body portion 102 into the second valve body portion 120. Depressing the first valve body portion 102 causes the dispensing valve 100 to move from a closed position to an open position, resulting in fluid flow of food product out of the dispensing valve 100. In other embodiments, the system 10 may include an actuator to operate the dispensing valve 100. For example, the actuator could be a lever, a button, or any other type of actuating device.

As shown in FIG. 1A, the system 10 may optionally comprise a handle portion 400. The handle portion 400 can be used to manipulate the dispensing valve 100 between the open position and the closed position. The handle portion 400 may be detachably coupled or integrally coupled to the canister 300. The handle portion may be moveably coupled to the canister 300. In some embodiments, the handle portion 400 can be coupled to the canister lid 304, the canister base 302, or any other portion of the canister 300. The handle portion 400 may extend out from the canister 300 and over the dispensing valve 100. The handle portion 400 may comprise an opening configured to receive the nozzle portion 104. When the system 10 is assembled, the nozzle portion 104 may protrude through the opening in the handle portion 400. When the system 10 is assembled, the handle portion 400 may default to a position in which it is resting on or hovering over the surface 118 extending from the first valve body portion 102. In other embodiments, the handle portion 400 may be coupled to the surface 118 or any other portion of the first valve body portion 102. One end of the handle portion 400 may not be coupled or attached to the canister 300. The handle portion 400 may function as a lever, whereby the handle portion 400 can be depressed to exert a force on the dispensing valve 100. The handle portion 400 may comprise an elongated portion disposed at one end for receiving the depressive force. In operation, a user can place their fingers over the elongated portion of the handle portion 400 and exert a depressive force on the handle portion 400. In response to being depressed, the handle portion 400 is pushed into the surface 118, causing the first valve body portion 102 to axially translate towards the second valve body portion 120. The handle portion 400 can be depressed sufficiently to manipulate the dispensing valve 100 to the open position, thereby allowing for food product to be dispensed. The handle portion 400 can be made from a flexible or semi-flexible material. Alternatively, the handle portion 400 can be made from a rigid material. The handle portion 400 may be biased to return to its default position when the depressive force is removed to allow the dispensing valve 100 to return to the closed position. The handle portion 400 allows for operation of the dispensing without touching the dispensing valve.

As shown in FIG. 3, the second valve body portion 120 may comprise an attachment end 122, an actuator end 124, and/or a valve chamber 126. The attachment end 122 and actuator end 124 are disposed on opposing ends of the second valve body portion 120. A valve chamber 126 may extend axially through the second valve body portion 120.

The attachment end 122 may be configured to attach to the pouch 200. The attachment end 122 may be configured to attach to the valve fitment 206 on the pouch 200. As shown in FIG. 3, the portion of the valve chamber 126 proximal to the attachment end 122 may comprise threading configured to receive the valve fitment 206. The pouch 200 may be removably attached to the dispenser valve by twisting the valve fitment 206 into the attachment end 122. In other embodiments the attachment end 122 may be configured to attach to the pouch 200 via any suitable coupling mechanism such as a latch, glue, material bonding, or the like. Additionally, in other embodiments the attachment end 122 may be permanently or non-removably attached to the pouch 200.

When a pouch 200 is attached to the dispensing valve 100, the valve chamber 126 is in fluid communication with the interior 204 of the pouch 200. As shown in FIG. 3, the portion of the valve chamber 126 proximal to the actuator end 124 may be configured to receive the piston 108. At a position intermediate the actuator end 124 and the attachment end 122, the valve chamber 126 may increase in diameter to accommodate the increased diameter of the distal end 109 of the piston 108.

Figure 4:
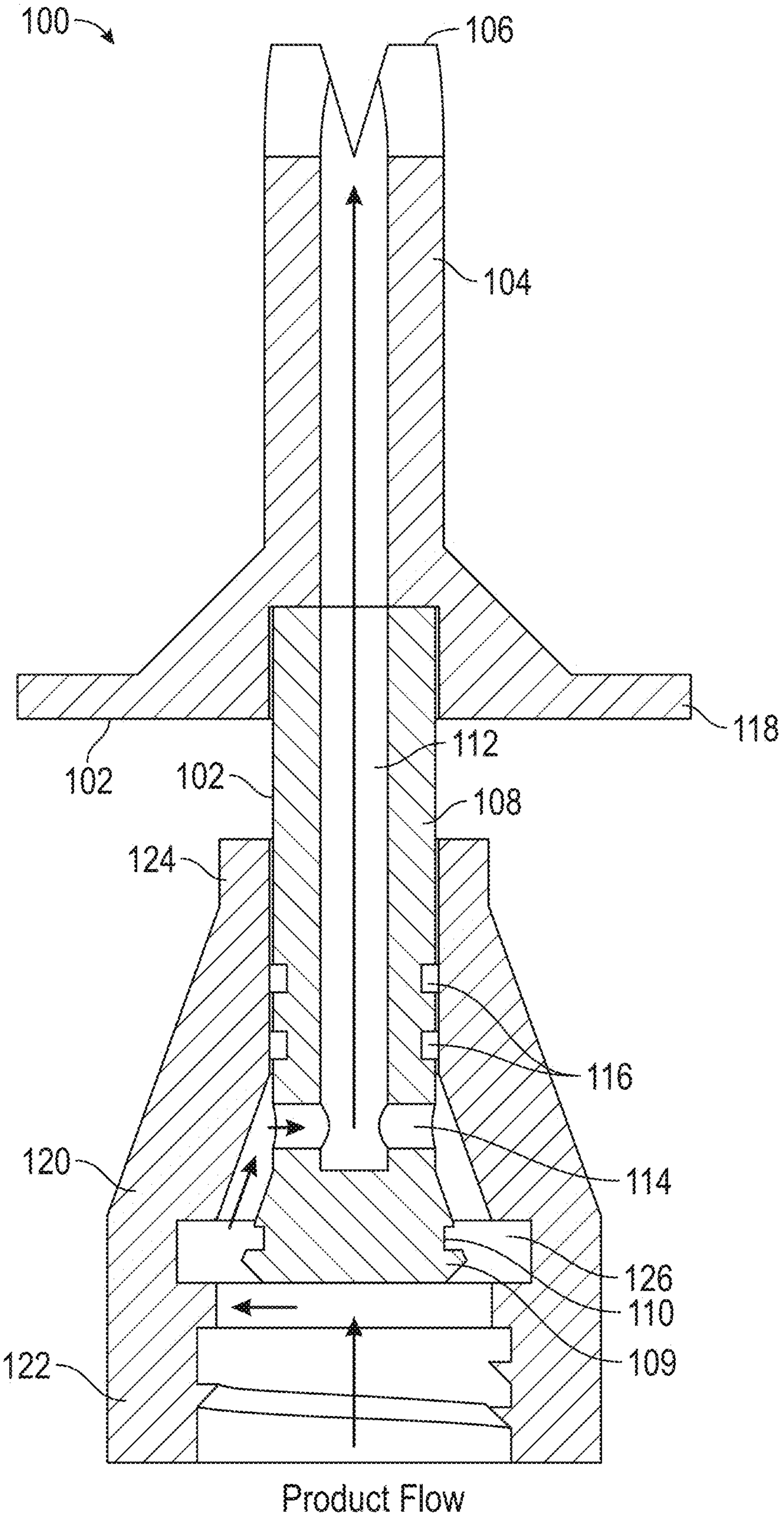
FIG. 4 depicts a cross-sectional view of the dispensing valve shown in FIG. 1 in an open position.

As shown in FIGS. 3-4, the piston 108 is configured to axially translate within the valve chamber 126. When a pressurized pouch 200 containing a food product is attached to the dispensing valve 100, the internal pressure within the valve chamber 126 exerts a force on the distal end 109 of the piston 108 and biases the dispensing valve 100 to the closed position illustrated in FIG. 3. Relative to its location in the open position, when the piston 108 is in the closed position it can be biased towards the actuator end 124 and away from the attachment end 122.

As shown in FIG. 3, when the dispensing valve is in the closed position, the first valve seal 110 makes circumferential contact with the surrounding walls of the valve chamber 126 to prevent fluid flow from the valve chamber 126 into the first valve port 114. Accordingly, when the dispensing valve 100 is in the closed position, the interior channel 112 is not in fluid communication with the valve chamber 126. As illustrated by the product flow arrows in FIG. 3, when the dispensing valve 100 is in the closed position, the food product flows from the interior 204 of the pouch 200 into the valve chamber 126 where it stops. Pressurization of the pouch 200 is maintained when the dispensing valve 100 is in the closed position.

FIG. 4 depicts a cross-sectional view of the dispensing valve 100 in an open position. The dispensing valve 100 can be manipulated from the closed position to the open position by axially translating the piston 108 within the valve chamber 126 towards the attachment end 122 of the second valve body portion 120. A surface 118 extending radially from the first valve body portion 102 may be utilized by a user to manually depress the first valve body portion 102 and manipulate the dispensing valve 100 into the open position. Relative to its location in the closed position, when the piston 108 is in the open position it is disposed proximal to the actuator end 124 and distal to the attachment end 122. In the open position, the first valve seal 110 does not make circumferential contact with the surrounding walls of the valve chamber 126. As a result, fluid flow is permitted between the valve chamber 126 and the first valve port 114. When the dispensing valve 100 is in the open position, the interior channel 112 is in fluid communication with the valve chamber 126 via the first valve port 114. As illustrated by the product flow arrows in FIG. 4, when the dispensing valve 100 is in the open position, the food product can flow from the interior 204 of the pouch 200 into the valve chamber 126, then into first valve port 114, then into the interior channel 112 where it exits out of the fluid outlet 106. Fluid flow of the food product out of the dispensing valve 100 is driven by interior pressurization of the pouch 200. When the dispensing valve 100 is in the open position, a pressure differential between the exterior atmospheric pressure and the interior pressure of the pouch 200 causes a fluid flow out of the dispensing valve 100.

Manipulating the dispensing valve 100 to the open position also facilitates pressurization of the pouch 200. The pouch 200 may be pressurized by attaching a source of pressurized gas to the nozzle portion 104. When the dispensing valve 100 is in the open position, pressurized gas can flow from the source of pressurized gas into the interior chamber, then into the first valve port 114, then into the valve chamber 126, and then finally into the interior 204 of the pouch 200. The pressurized gas mixes with any food product contained in the pouch 200. After pressurization of the pouch 200, the dispensing valve 100 may be manipulated to the closed position to maintain pressurization inside the pouch 200. After pressurization of the pouch 200, the dispensing valve 100 may be manipulated to the closed position by simply removing the exerted depressive force on the surface 118 extending radially from the first valve body portion 102. In the absence of a depressive force on the first valve body portion 102, the interior pressure biases the dispensing valve 100 back to the closed position.

Figure 5:
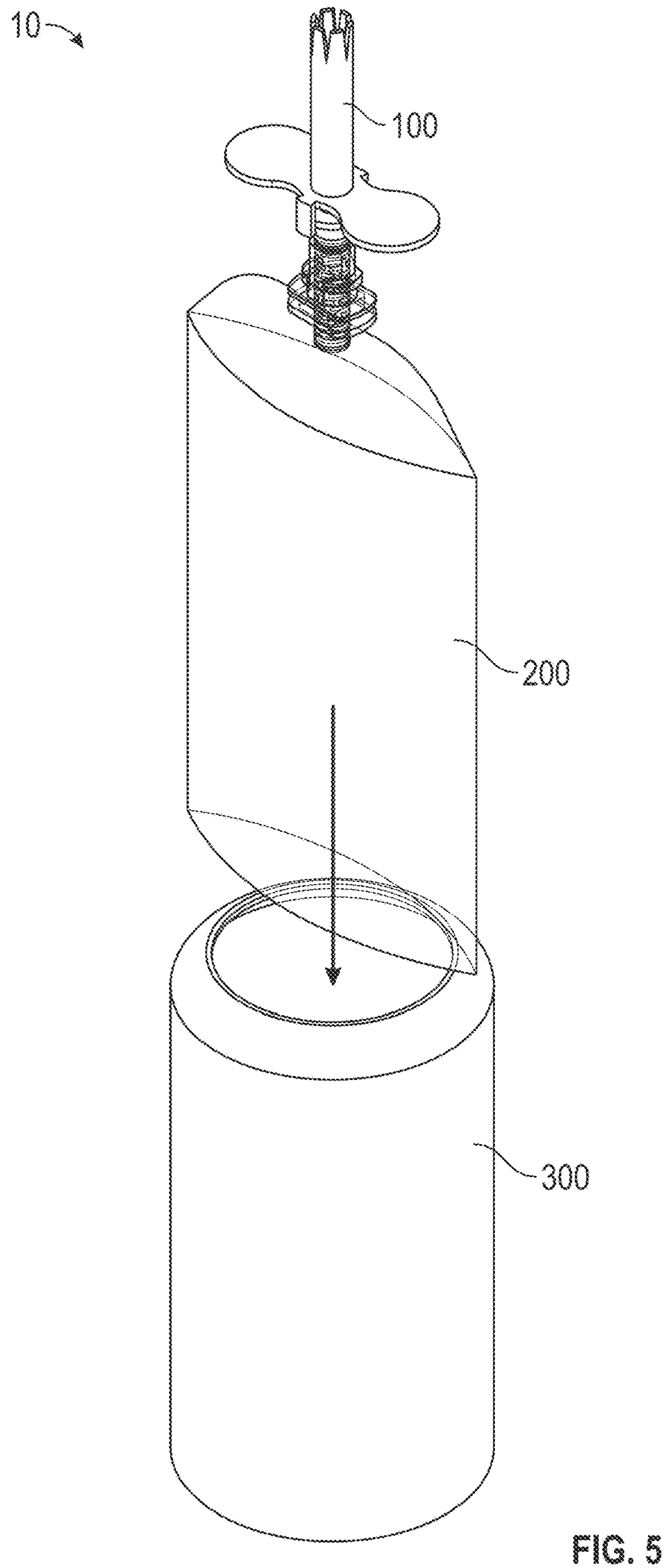
FIG. 5 depicts a perspective view of another system for pressurizing and dispensing a food product comprising a pouch, a dispensing valve, and a canister.

FIG. 5 depicts another configuration of a system 10 for pressurizing and dispensing a food product, which may include any of the features described above with respect to FIGS. 1-4. The system 10 may include a pouch 200 and a dispensing valve 100. The system 10 may additionally include a canister 300 for holding the pouch 200. The canister 300 may be a substantially cylindrical vessel with an opening for inserting the pouch 200. In other embodiments, the canister 300 may form any shape suitable for containing a pouch 200 in its interior volume. In the illustrated configuration, an inner diameter of the canister 300 decreases at the opening to form a shoulder portion. The shoulder portion functions to retain the pouch 200 within the canister 300 when the pouch 200 is in a pressurized state.

Figure 6:
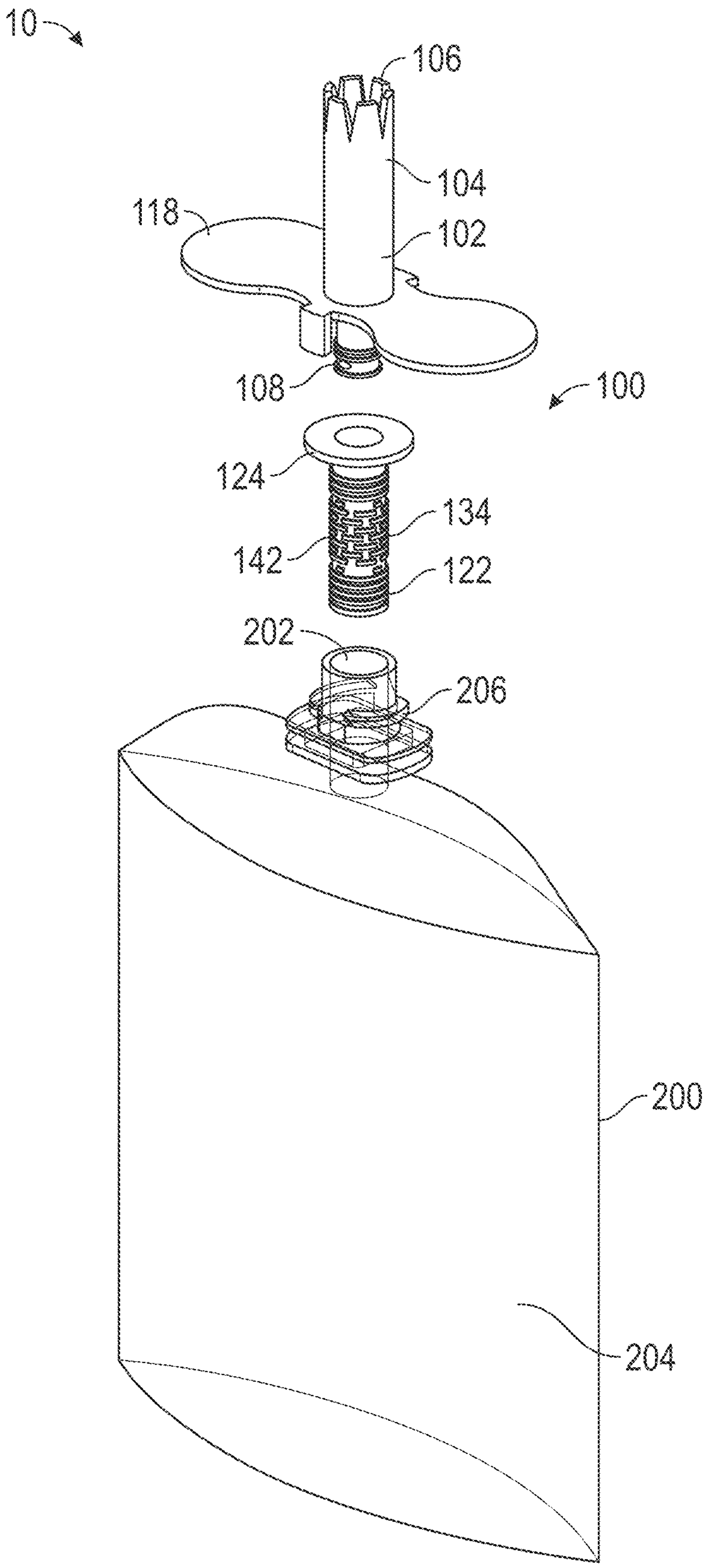
FIG. 6 depicts an exploded view of the system for dispensing a food product shown in FIG. 5.

FIG. 6 depicts an exploded view of example components of the system 10 shown in FIG. 5. The pouch 200 defines an interior 204 which is fillable with a food product. The pouch 200 may be configured to be coupled to the dispensing valve 100. The pouch 200 may comprise a valve fitment 206 coupled to an opening 202 into the interior 204 of the pouch 200. The pouch 200 may be coupled to the dispensing valve 100 via the valve fitment 206. The pouch 200 may be removably or non-removably coupled to the dispensing valve 100. A portion of the dispensing valve 100 may be inserted into valve fitment 206. In other embodiments, the pouch 200 may be coupled to the dispensing valve 100 via a latch, glue, material bonding, or any other means for coupling objects together. In other embodiments, the pouch 200 may include more than one opening 202. For instance, the pouch 200 may include two or more openings 202, wherein one opening 202 can function as a food product outlet and another opening 202 can function as a pressurized gas inlet. In some embodiments, an opening 202 used as a food product outlet can be coupled to a dispensing valve 100, and an opening 202 used as a pressurized gas inlet can be coupled to a port configured to receive pressurized gas from a source of pressurized gas.

As shown in FIG. 6, the valve fitment 206 may additionally comprise a tubular body extending within the opening 202 of the pouch 200. The valve fitment 206 may extend from a top of the pouch 200, for example from an edge of the pouch 200 at a substantially 90-degree angle. The position of the valve fitment 206 is not critical and may vary depending on the particular dispensing application. In other embodiments, the valve fitment 206 may be positioned at any location on the pouch 200 and at any angle therefrom.

As shown in FIG. 6, the dispensing valve 100 may comprise a first valve body portion 102 moveably coupled to a second valve body portion 120. In other embodiments, the dispensing valve 100 may only comprise the first valve body portion 102. The dispensing valve 100 may be manipulated between a closed position and an open position by moving the first valve body portion 102 axially relative to the second valve body portion 120. The first valve body portion 102 may be coupled to the second valve body via one or more clips or any other suitable mechanism for moveably attaching components together. The dispensing valve 100 may be configured to receive an intake of pressurized gas and dispense a food product via a single nozzle portion 104. The dispensing valve 100 may be configured to be coupled to the pouch 200. When the pouch 200 is disposed within the canister 300 and the dispensing valve 100 is coupled to the pouch 200, the dispensing valve 100 may protrude from the canister 300 to allow for manual manipulation of the dispensing valve 100 by a user. The dispensing valve 100 may be disposable such that it is thrown out after a single use, or it may be reusable.

Figure 7:
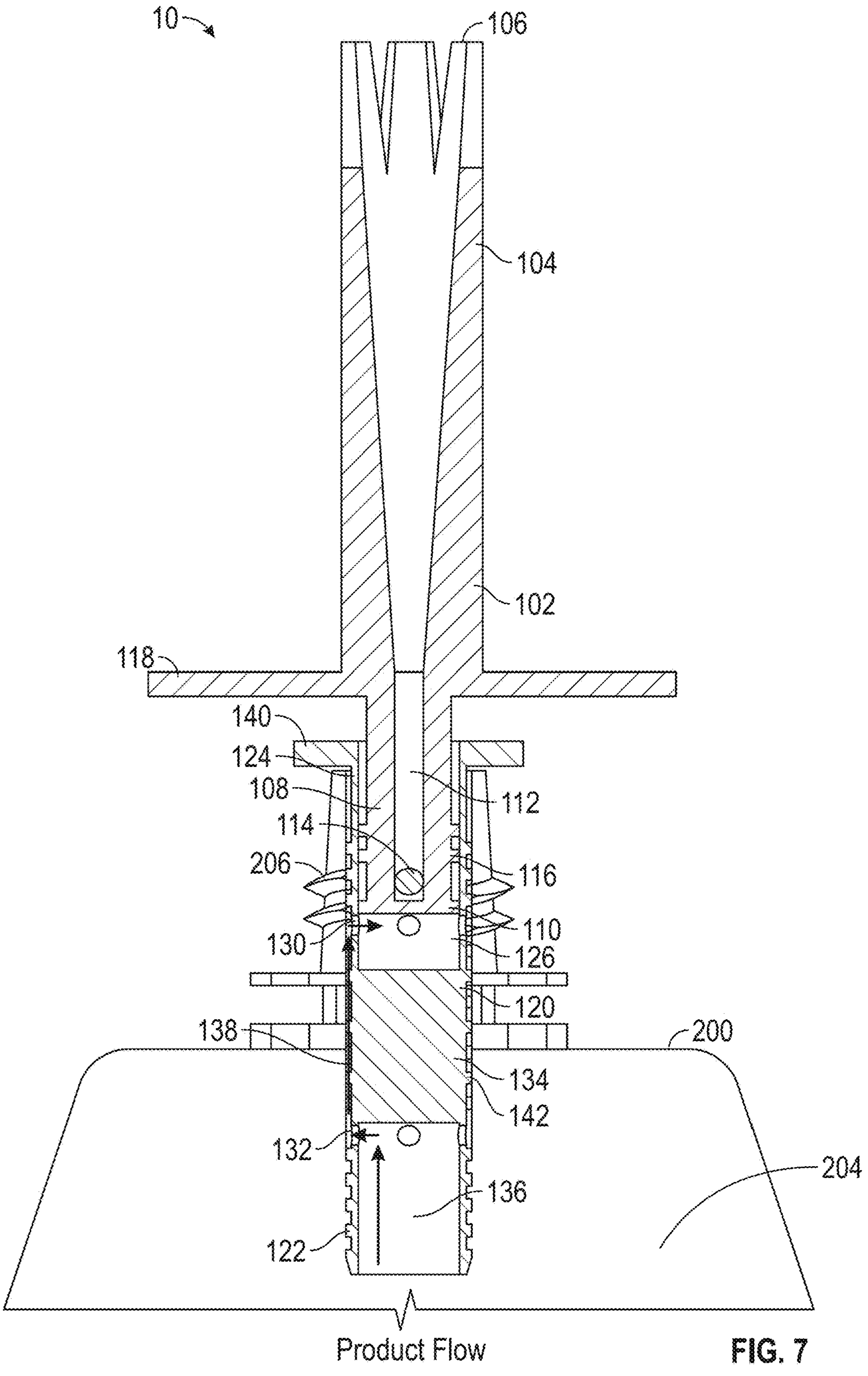
FIG. 7 depicts a cross-sectional view of the dispensing valve shown in FIG. 5 in a closed position.
Figure 8:
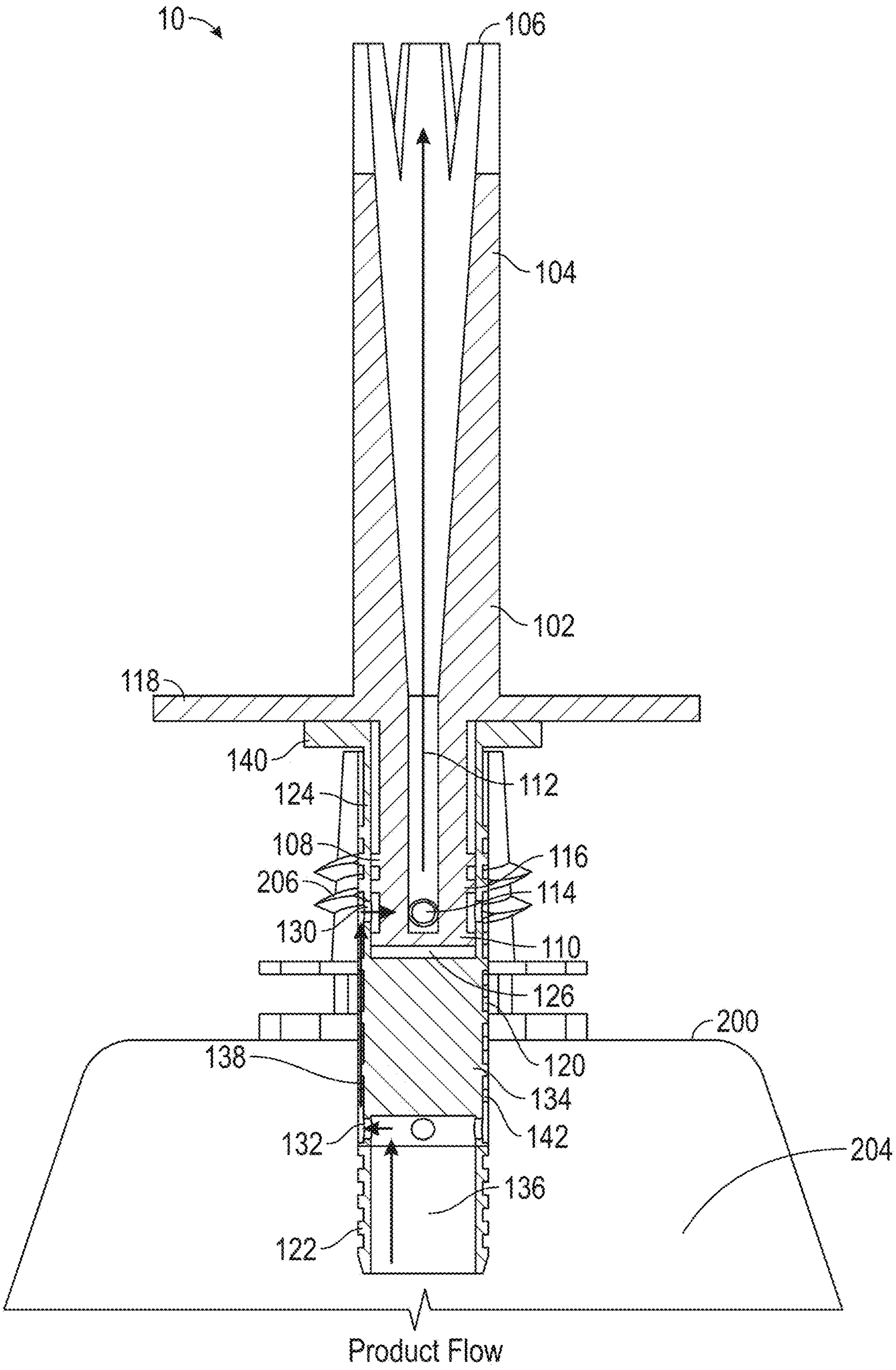
FIG. 8 depicts a cross-sectional view of the dispensing valve shown in FIG. 5 in an open position.

FIG. 7 depicts a cross-sectional view of the dispensing valve 100 of FIGS. 5-6 in a closed position. In the closed position, the first valve body portion 102 is positioned relative to second valve body portion 120 such that fluids cannot flow through the dispensing valve 100. FIG. 8 depicts a cross-sectional view of the dispensing valve 100 of FIGS. 5-6 in an open position in which fluid can flow out of the dispensing valve 100. The user can manipulate the dispensing valve 100 in a similar manner as described above with respect to FIGS. 3-4.

As shown in FIG. 7, the first valve body portion 102 may include a piston 108, a nozzle portion 104, an interior channel 112, and/or a first valve port 114. The piston 108 may form a generally cylindrical shape having a circular cross section. In other configurations, the piston 108 may have a cross section that is rectangular, triangular, hexagonal, or any other shape. The piston 108 may have a substantially constant outer diameter along its length. The nozzle portion 104 can be coupled to and extend axially away from the piston 108. The nozzle portion 104 may comprise a fluid outlet 106 disposed at an end of the nozzle portion 104 distal to the piston 108. The fluid outlet 106 may be an opening into the nozzle portion 104. The nozzle portion 104 and the piston 108 may be integrally connected. In other embodiments, the piston 108 and nozzle portion 104 may be manufactured as separate components and joined together.

As shown in FIG. 7, an interior channel 112 may extend axially within the first valve body. The interior channel 112 may extend from a position proximal to a distal end 109 of the piston 108 to the fluid outlet 106. The interior channel 112 may have a circular cross section with a diameter that increases from a minimum diameter proximal to the piston 108 to a maximum diameter at the fluid outlet 106. In other configurations, the interior channel 112 may have a rectangular, triangular, hexagonal, or any other shaped cross-section. Additionally, in other configuration the diameter of the interior channel 112 may be constant or non-constant along its length.

As shown in FIG. 7, a first valve port 114 may extend through a wall of the interior channel 112 such that the first valve port 114 and interior channel 112 are in fluid communication. The first valve port 114 may be located at a position proximal to the piston 108. Specifically, the first valve port 114 may be positioned proximal to the distal end 109 of the piston 108. The first valve port 114 may be any shape, such as a circular hole. Additionally, there may be one, two, three, or more first valve ports 114 positioned radially around the interior channel 112. In some embodiments, there may be two first valve ports 114 disposed on opposing surfaces of the interior channel 112.

As shown in FIG. 7, the first valve body portion 102 may further comprise a first valve seal 110. The first valve seal 110 can be disposed circumferentially around the distal end 109 of the piston 108. The first valve seal 110 functions to prevent fluid flow around the piston 108 and into the first valve port 114 when the dispensing valve 100 is in a closed position. In some embodiments, the valve seal may be an O-ring seal. In other embodiments, the function of the first valve seal 110 may be performed by the distal end 109 of the piston 108 by making circumferential contact with the walls of the valve chamber 126. The first valve body portion 102 may further comprise a second valve seal 116 disposed circumferentially around the piston 108. The second valve seal 116 may be disposed on the piston 108 such that the first valve port 114 is positioned intermediate the first valve seal 110 and the second valve seal 116. When the dispensing valve 100 is in an open position, the second valve seal 116 functions to prevent fluid flow around the piston 108 and out of the actuator end 124. The second valve seal 116 may be an O-ring seal, an integral protrusion extending from the piston 108, or any other suitable sealing mechanism. In some embodiments, additional valve seals may be disposed along the piston 108.

As shown in FIG. 7, the first valve body portion 102 may further comprise a surface 118 extending outward from the first valve body portion 102 configured to allow a user to manually translate the dispensing valve 100 between the open position and the closed position. The surface 118 may take the form of two substantially circular disc protrusions extending from opposing sides of the first valve body portion 102. To operate the dispensing valve 100, the user may place their fingers over the surface 118 and exert a force on the surface 118 to depress the first valve body portion 102 into the second valve body portion 120. Depressing the first valve body portion 102 causes the dispensing valve 100 to move from a closed position to an open position, resulting in fluid flow of food product out of the dispensing valve 100.

As shown in FIG. 7, the second valve body portion 120 may comprise an attachment end 122, an actuator end 124, and a fluid passageway 138 therebetween. The second valve body portion 120 may include a valve block portion 134 disposed within the fluid passageway 138 and between the attachment end 122 and actuator end 124. The attachment end 122 and actuator end 124 are disposed on opposing ends of the second valve body portion 120. The second valve body portion 120 may be configured to be inserted into the valve fitment 206 of the pouch 200.

As shown in FIG. 7, a stopper portion 140 may extend from the second valve body portion 120 proximal to the actuator end 124 to prevent the second valve body portion 120 from falling into the interior 204 of the pouch 200.

As shown in FIG. 7, a valve chamber 126 may extend axially through the actuator end 124. A fluid inlet chamber 136 may extend axially through the attachment end 122. The valve block portion 134 may be disposed between the valve chamber 126 and the fluid inlet chamber 136 such that opposing ends of the valve block portion 134 define surfaces of the valve chamber 126 and the fluid inlet chamber 136. The outer diameter of the valve block portion 134 may be smaller than the inner diameter of the valve fitment 206 to define a fluid passageway 138 between an outer surface of the valve block portion 134 and an inner surface of the valve fitment 206.

As shown in FIG. 6, a plurality of ribs 142 may extend from an outer surface of the valve block portion 134. The ribs 142 function to facilitate mixing of the food product as it passes along the fluid passageway 138. In the other configurations there may be no ribs 142 or only one rib 142 extending from the valve block portion 134.

As shown in FIG. 7, the second valve body portion 120 may include one or more valve ports. For example, the second valve body portion 120 may comprise a second valve port 130 extending through a wall of the valve chamber 126. The second valve port 130 may be in fluid communication with the valve chamber 126. The second valve port 130 may be any shape, such as a circular hole. Additionally, there may be one, two, three, or more second valve ports 130 positioned radially around the valve chamber 126. In some embodiments there may be four second valve ports 130 radially spaced at substantially 90-degree increments around the valve chamber 126. The second valve body portion 120 may additionally comprise a third valve port 132 extending through a wall of the fluid inlet chamber 136. The third valve port 132 may be in fluid communication with the fluid inlet chamber 136. The third valve port 132 may be any shape, such as a circular hole. Additionally, there may be one, two, three, or more third valve ports 132 positioned radially around the fluid inlet chamber 136. In some embodiments, there may be four third valve ports 132 radially spaced at substantially 90-degree increments around the fluid inlet chamber 136. When the dispensing valve 100 is coupled to a pouch 200 via insertion into the valve fitment 206, the fluid inlet chamber 136 may be in fluid communication with the interior 204 of the pouch 200.

As shown in FIG. 7, the second valve body portion 120 may further comprise one or more exterior seals disposed on an exterior surface of the second valve body portion 120. The exterior seal may be disposed circumferentially around an exterior surface of the second valve body portion 120 to create a seal between the exterior surface of the second valve body portion 120 and an inner surface of the valve fitment 206. The exterior seal may be an O-ring seal, an integral protrusion extending from the second valve body portion 120, or any other suitable sealing mechanism. An exterior seal may be disposed on the actuator end 124 to prevent fluid flow around the exterior surface of the actuator end 124. Additionally, another exterior seal may be disposed on the attachment end 122. In other configurations, there may be zero, one, two, or more exterior seals disposed on the second valve body portion 120.

As shown in FIGS. 7-8, the piston 108 may be configured to axially translate within the valve chamber 126. When a pressurized pouch 200 containing a food product is attached to the dispensing valve 100, the internal pressure within the valve chamber 126 exerts a force on the distal end 109 of the piston 108 and biases the dispensing valve 100 to the closed position illustrated in FIG. 7. Relative to its location in the open position, when the piston 108 is in the closed position it is biased away from the valve block portion 134. In the closed position, the first valve seal 110 is disposed between the first valve port 114 and the second valve port 130. The first valve seal 110 makes circumferential contact with the surrounding walls of the valve chamber 126 to prevent fluid flow from the valve chamber 126 into the first valve port 114.

In the closed position depicted by FIG. 7, the first valve port 114 is misaligned with the second valve port 130. Accordingly, when the dispensing valve 100 is in the closed position, the interior channel 112 is not in fluid communication with the valve chamber 126 or the interior 204 of the pouch 200. As illustrated by the product flow arrows in FIG. 7, when the dispensing valve 100 is in the closed position, the food product can flow from the interior 204 of the pouch 200 into the fluid inlet chamber 136, then through the third valve port 132, then along the fluid passageway 138, then through the second valve port 130 into the valve chamber 126 where it stops. Pressurization of the pouch 200 is maintained when the dispensing valve 100 is in the closed position.

FIG. 8 depicts a cross-sectional view of the dispensing valve 100 of FIGS. 5-6 in an open position. The dispensing valve 100 can be manipulated from the closed position to the open position by axially translating the piston 108 within the valve chamber 126 towards the attachment end 122 of the second valve body portion 120. A surface 118 extending from the first valve body portion 102 may be utilized by a user to manually depress the first valve body portion 102 and manipulate the dispensing valve 100 into the open position. Relative to its location in the closed position, when the piston 108 is in the open position it is disposed proximal to the valve block portion 134. In the open position, the first valve seal 110 is no longer disposed between the first valve port 114 and the second valve port 130. In the open position, the first valve port 114 is aligned with the second valve port 130, such that the first valve port 114 and the second valve port 130 are in fluid communication. When the dispensing valve 100 is in the open position, the interior channel 112 is in fluid communication with the fluid inlet chamber 136 via the first valve port 114, the second valve port 130, the fluid passageway 138, and the third valve port 132. As illustrated by the product flow arrows in FIG. 8, when the dispensing valve 100 is in the open position, the food product can flow from the interior 204 of the pouch 200 into the fluid inlet chamber 136, then through the third valve port 132, then along the fluid passageway 138, then through the aligned second valve port 130 and first valve port 114 into the interior channel 112, and then finally out of the fluid outlet 106. Fluid flow of the food product out of the dispensing valve 100 is driven by interior pressurization of the pouch 200. When the dispensing valve 100 is in the open position, a pressure differential between the exterior atmospheric pressure and the interior pressure of the pouch 200 causes a fluid flow out of the dispensing valve 100.

Manipulating the dispensing valve 100 to the open position also facilitates pressurization of the pouch 200. The pouch 200 may be pressurized by attaching a source of pressurized gas to the nozzle portion 104. When the dispensing valve 100 is in the open position, pressurized gas can flow from the source of pressurized gas into the interior chamber, then into the first valve port 114, then into the second valve port 130, then through the fluid passageway 138, then through the third valve port 132 into the fluid inlet chamber 136, and then finally into the interior 204 of the pouch 200. The pressurized gas mixes with the food product contained in the pouch 200. After pressurization of the pouch 200, the dispensing valve 100 may be manipulated to the closed position to maintain pressurization inside the pouch 200. After pressurization of the pouch 200, the dispensing valve 100 may be manipulated to the closed position by simply removing the exerted depressive force on the surface 118 extending from the first valve body portion 102. In the absence of a depressive force on the first valve body portion 102, the interior pressure biases the dispensing valve 100 back to the closed position.

Figure 9:
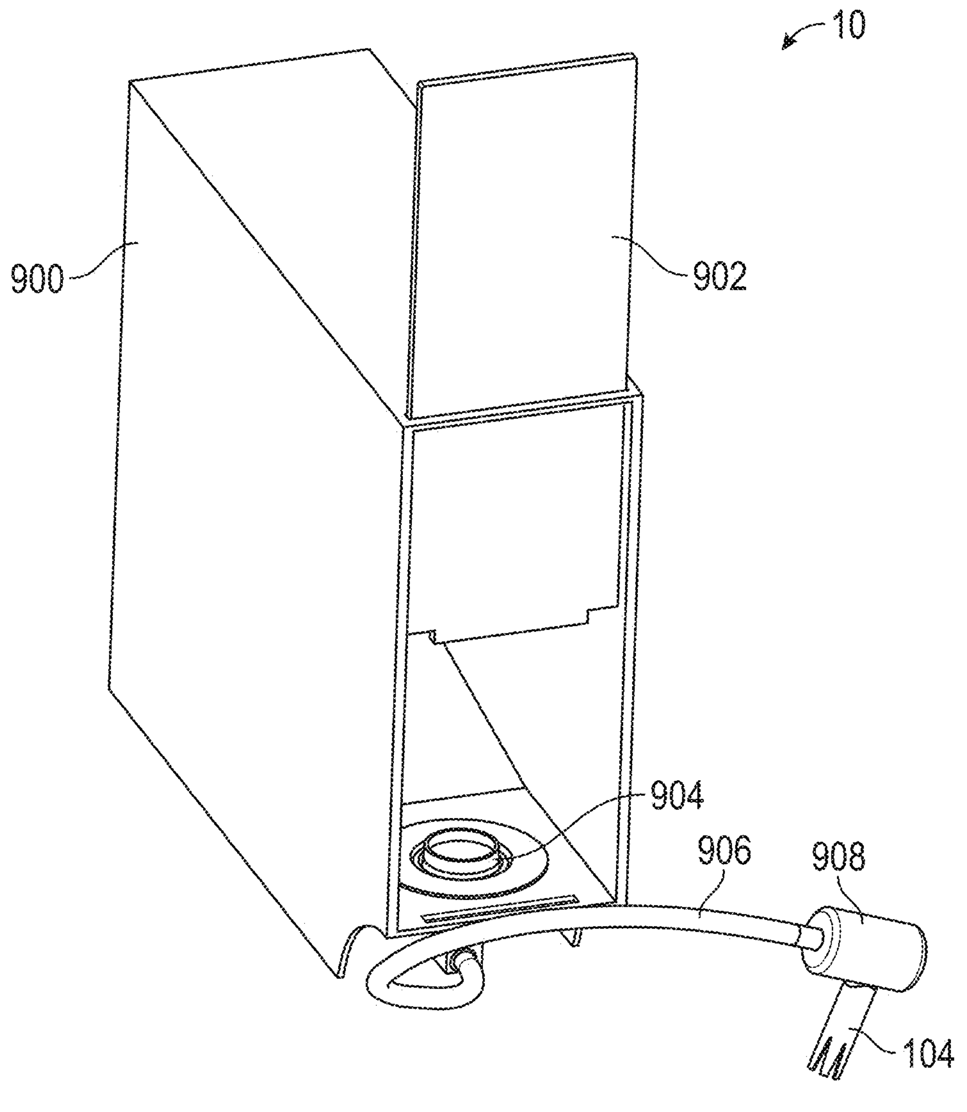
FIG. 9 depicts a perspective view of a tabletop format of a system for pressurizing and dispensing a food product.

FIG. 9 depicts a tabletop format of a system 10 for pressurizing and dispensing a food product. The larger size of the tabletop format allows for the use of larger pouches 200 containing increased amounts of food product. The tabletop format may comprise a container 900, an attachment portion 904, a hose 906, and a dispenser head 908. The container 900 may be a substantially hollow vessel in the shape of a rectangular prism. The container 900 may be configured to hold a pouch 200 within its interior volume.

The container 900 may comprise a container lid 902 configured to be coupled to an opening in the container 900. The container lid 902 may be removably coupled to the container 900 to reveal or seal off the opening. The tabletop format may comprise an attachment portion 904 configured to attach to a pouch 200. The attachment portion 904 may be coupled to a surface of the container 900 and may comprise a tube extending through the surface of the container 900. The attachment portion 904 may additionally be coupled to a hose 906. The hose 906 may be coupled to the attachment portion 904 at one end and be coupled to a dispenser head 908 at an opposing end. When a pouch 200 is attached to the attachment portion 904, the hose 906 functions to facilitate fluid communication between the interior 204 of the pouch 200 and the dispenser head 908. The dispenser head 908 may comprise a dispensing valve 100, a nozzle portion 104, and an actuator. The dispensing head may be configured to house the dispensing valve 100 within its interior. A dispensing valve 100, such as one embodied in the configurations shown in FIGS. 1-8, may be disposed within the dispenser head 908. A nozzle portion 104 may extend from an exterior surface of the dispensing head for dispensing food product. The nozzle portion 104 may additionally be configured to attach to a source of pressurized gas and receive an intake of pressurized gas to charge a pouch 200. The dispenser head 908 may additionally comprise an actuator for manipulating the dispensing valve 100 between a closed position and an open position. The actuator may be disposed on an exterior surface of the dispenser head 908. For instance, the actuator may be a button which can be depressed to manipulate the dispensing valve 100 from the closed position to the open position to allow for flow of food product out of the dispenser head 908. When the dispensing valve 100 is manipulated to the open position, food product flows from the interior 204 of the pouch 200, into the hose 906, through the dispensing valve 100, and out of the nozzle portion 104. In other configurations, the system 10 may not include a hose 906, and the dispenser head 908 may be directly attached to the attachment portion 904 or pouch 200.

Figure 10A:
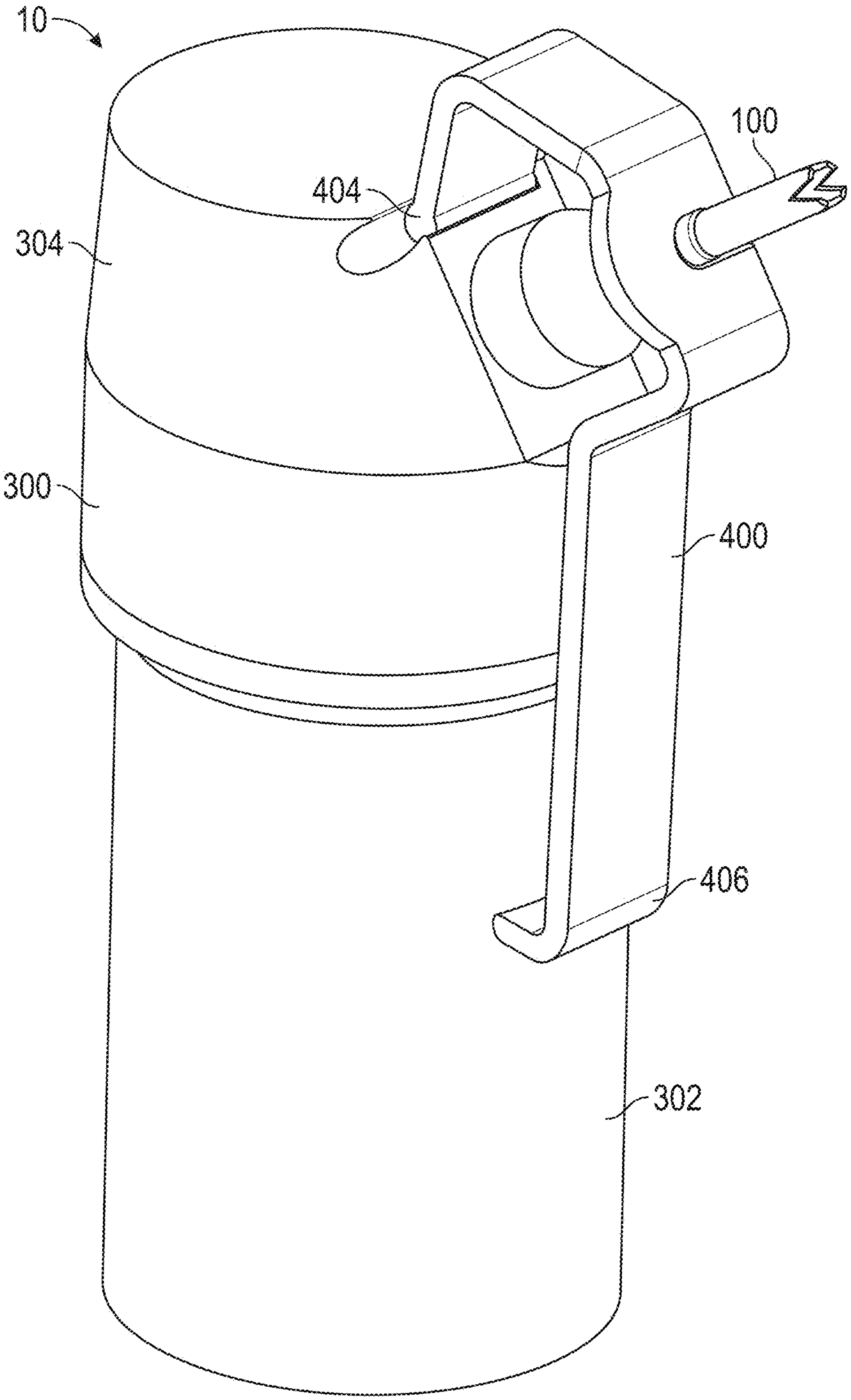
FIG. 10A depicts a right-side perspective view of a system for pressurizing and dispensing a food product.
Figure 10B:
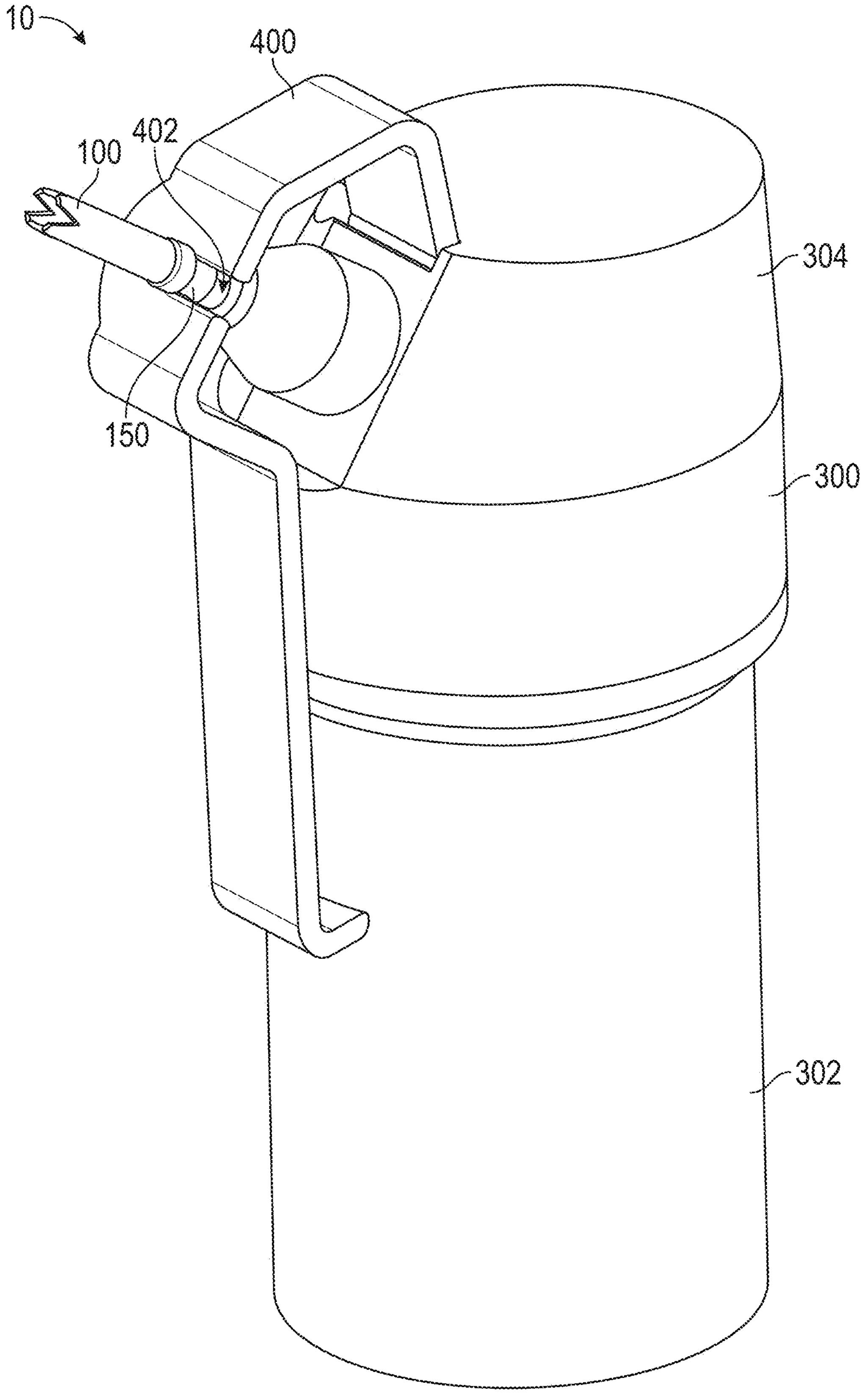
FIG. 10B depicts a left-side perspective view of the system of FIG. 10A.
Figure 10C:
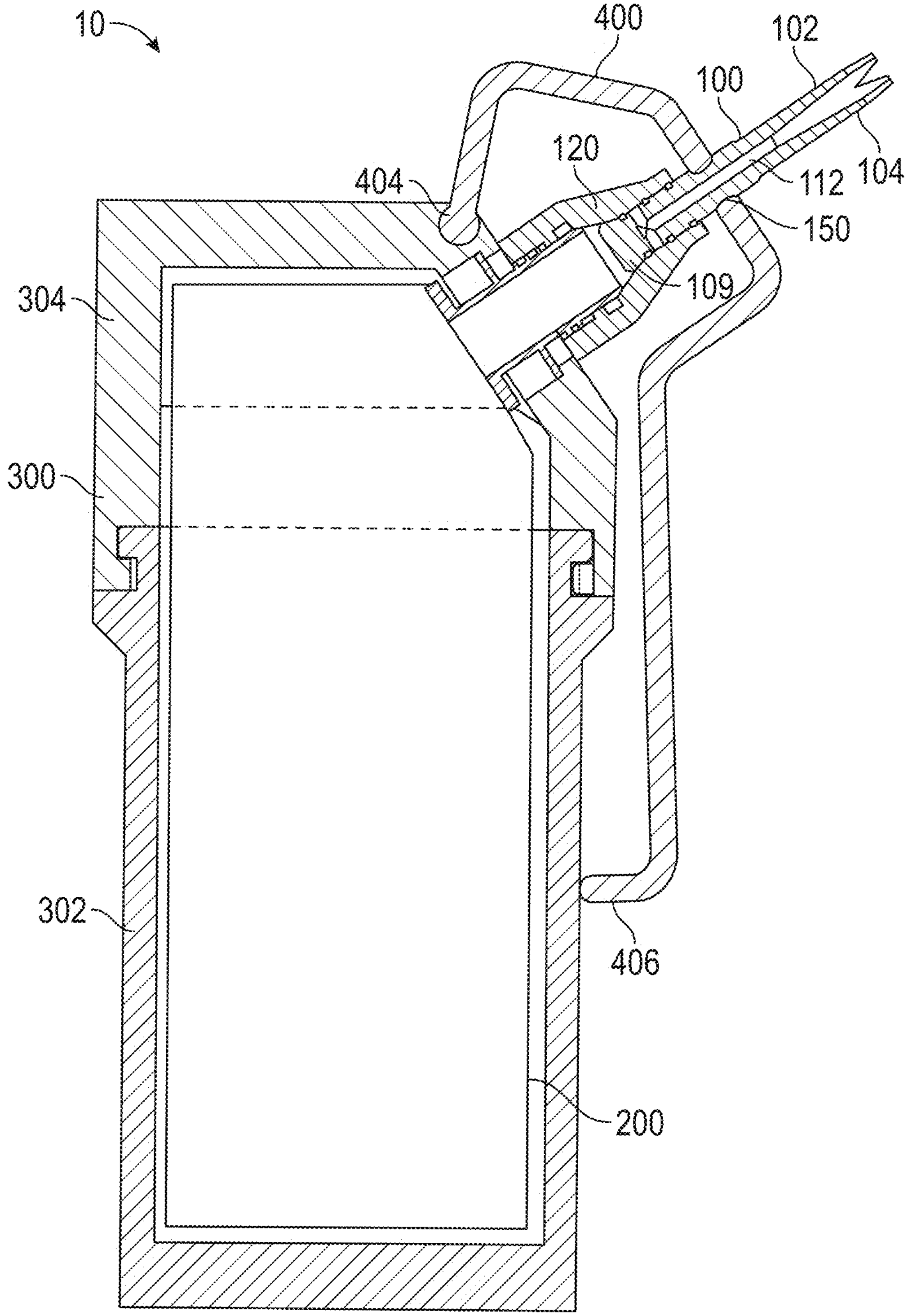
FIG. 10C depicts a cross-section view of the system of FIG. 10A.

FIG. 10A depicts a right-side perspective view of yet another configuration of a system 10 for pressurizing and dispensing a food product, which may include any of the features described above with respect to FIGS. 1-9. FIG. 10B depicts a left-side perspective view of the system 10 of FIG. 10A. FIG. 10C depicts a cross-section view of the system 10 of FIG. 10A. As shown in FIG. 10C, the first valve body portion 102 can be formed as a single integral component rather than as an assembly of multiple separate components. Specifically, the piston 108 and the nozzle portion 104 can be formed as a single integral component. With reference to FIGS. 10B-10C, the first valve body portion 102 can also include an exterior groove 150. As shown in FIG. 10C, the exterior groove 150 can extend circumferentially around the first valve body portion 102. The exterior groove 150 can function as a contact surface (e.g., surface 118) between the handle portion 400 and the first valve body portion 102. As shown in FIG. 10C, a pouch 200 can be disposed within the canister 300.

As shown in FIG. 10B, the handle portion 400 can include a slot 402. The slot 402 can be an open-ended slot shaped to receive the first valve body portion 102. Specifically, the exterior groove 150 of the first valve body portion 102 can be moved along and into the slot 402 to couple to the first valve body portion 102 to the handle portion 400. The nozzle portion 104 of the first valve body portion 102 can extend through and beyond the slot 402 of the handle portion 400. When the exterior groove 150 and the slot 402 are interlocked, the exterior groove 150 can inhibit axial movement of the first valve body portion 102 relative to the handle portion 400. As shown in FIG. 10A, the handle portion can be pivotably coupled to the cannister 300. For example, a first end 404 of the handle portion 400 can be pivotably coupled to the cannister lid 304. In some embodiments, a second end 406 of the handle portion 400 can be freely movable (e.g., not coupled to the cannister 300). In other embodiments, the second end 406 of the handle portion 400 can be pivotably or fixedly coupled to the cannister 300 and the first end 404 of the handle portion 400 can be freely movable. As described above, in operation a user can place their fingers over the handle portion 400 and exert a depressive force on the handle portion 400. In response to being depressed, the handle portion 400 can translate the depressive force to the first valve body portion 102, causing the first valve body portion 102 to axially translate towards the cannister 300 and the second valve body portion 120. The handle portion 400 can be depressed sufficiently to manipulate the dispensing valve 100 to the open position, thereby allowing for food product to be dispensed.

Although certain embodiments have been described herein in connection with a pouch 200, the system 10 described herein can be used without the pouch 200. For example, in some embodiments, the food product can be directly added to the canister 300.

Moreover, certain embodiments have been described herein in connection with whipped cream, but the system 10 and dispensing valve 100 described herein can be used to dispense any dairy-based food product, non-dairy food product, or dairy alternative food product. Additionally, the system 10 and dispensing valve 100 described herein can be used to dispense non-food products, such as fire suppressant. The system 10 and dispensing valve 100 described herein may be used to dispense any fluid or semi-fluid that can be whipped, foamed, or emulsified, such as cocoa, cream cheese, caramel, etc.

It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any prior art in this description is not, and should not be taken as, an acknowledgement or any form of suggestion that that prior art forms part of the common general knowledge in the field of endeavor in any country in the world.

The invention may also be said broadly to consist in the parts, elements and features referred to or indicated in the description of the application, individually or collectively, in any or all combinations of two or more of said parts, elements or features.

Where, in the foregoing description, reference has been made to integers or components having known equivalents thereof, those integers are herein incorporated as if individually set forth. In addition, where the term "substantially" or any of its variants have been used as a word of approximation adjacent to a numerical value or range, it is intended to provide sufficient flexibility in the adjacent numerical value or range that encompasses standard manufacturing tolerances and/or rounding to the next significant figure, whichever is greater.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects and advantages are necessarily required to practice the present invention. Accordingly, the scope of the present invention is intended to be defined only by the claims.

What is claimed is:

1. A system for pressurizing and dispensing a food product, the system comprising:

- a pouch configured to contain the food product, the pouch comprising:
  - an opening into an interior of the pouch; and
  - a valve fitment coupled to the opening; and
- a dispensing valve coupled to the pouch, the dispensing valve comprising:
  - a first valve body portion comprising:
    - a nozzle portion comprising a fluid outlet;
    - a piston coupled to the nozzle portion;
    - an interior channel extending axially within the first valve body portion from the piston to the fluid outlet; and
    - a first valve port extending through a wall of the interior channel proximal to the piston, wherein the piston is axially translatable between a closed position in which the interior channel is not in fluid communication with the interior of the pouch and an open position in which the interior channel is in fluid communication with the interior of the pouch.

2. The system of claim 1, further comprising a second valve body portion moveably coupled to the first valve body portion, the second valve body portion comprising:

an attachment end configured to couple to the valve fitment;

an actuator end disposed opposite the attachment end; and a valve chamber extending axially through the second valve body portion, wherein the valve chamber is in fluid communication with the interior of the pouch when the pouch is coupled to the dispensing valve, wherein the piston is disposed within the valve chamber proximal to the actuator end and axially translates within the valve chamber.

3. The system of claim 1, further comprising a canister configured to contain the pouch.

4. The system of claim 3, wherein an interior volume of the canister is less than an interior volume of the pouch.

5. The system of claim 3, further comprising a handle portion coupled to the canister and the first valve body portion, wherein the handle portion is depressible to move the first valve body portion towards the canister.

6. The system of claim 1, further comprising a surface extending radially outward from the first valve body portion configured to allow a user to manually translate the piston between the open position and the closed position.

7. The system of claim 1, wherein the nozzle portion is configured to removably couple to a source of pressurized gas and receive an intake of pressurized gas.

8. The system of claim 7, wherein the fluid outlet comprises a forked tip.

9. The system of claim 1, wherein the piston and the nozzle portion are formed as a single integral component.

10. The system of claim 1, wherein the dispensing valve is configured to removably couple to the pouch.

11. The system of claim 1, wherein the pouch is aseptic.

12. A dispensing valve for receiving pressurized gas from a source of pressurized gas and dispensing whipped cream from a pouch, the dispensing valve comprising:

a first valve body portion comprising:

a nozzle portion comprising a fluid outlet;

a piston coupled to the nozzle portion;

an interior channel extending axially within the first valve body portion from the piston to the fluid outlet; and a first valve port extending through a wall of the interior channel proximal to the piston; and a second valve body portion moveably coupled to the first valve body portion, the second valve body portion comprising:

an attachment end configured to be attached to the pouch;

an actuator end disposed opposite the attachment end; and a valve chamber extending axially through the second valve body portion, wherein the piston is axially translatable within the valve chamber between a closed position in which the interior channel is not in fluid communication with the valve chamber and an open position in which the interior channel is in fluid communication with the valve chamber.

13. The dispensing valve of claim 12, further comprising a first valve seal coupled to an end of the piston distal to the nozzle portion and a second valve seal coupled to the piston, wherein the second valve seal is disposed such that the first valve port is positioned between the first valve seal and the second valve seal.

14. The dispensing valve of claim 12, wherein the nozzle portion is configured to couple to the source of pressurized gas and receive an intake of pressurized gas.

15. The dispensing valve of claim 12, wherein the piston has an increased diameter at an end distal to the fluid outlet.

16. A method for pressurizing and dispensing a food product, the method comprising:

connecting a source of pressurized gas to a nozzle portion of a dispensing valve, wherein the dispensing valve is coupled to a pouch containing the food product;

manipulating the dispensing valve to an open position in which the nozzle portion is in fluid communication with an interior of the pouch;

charging the pouch with pressurized gas via the nozzle portion;

manipulating the dispensing valve to a closed position in which the nozzle portion is not in fluid communication with the interior of the pouch;

detaching the source of pressurized gas from the nozzle portion;

shaking the pouch to mix the food product with the pressurized gas;

manipulating the dispensing valve to the open position in which the nozzle portion is in fluid communication with the interior of the pouch; and dispensing the food product via the nozzle portion.

17. The method of claim 16, wherein manipulating the dispensing valve comprises moving a first valve body portion axially relative to a second valve body portion.

18. The method of claim 17, wherein moving the first valve body portion axially relative to the second valve body portion comprises axially translating a piston coupled to the first valve body portion within a valve chamber disposed within the second valve body portion.

19. The method of claim 16, further comprising placing the pouch into a canister prior to charging the pouch with pressurized gas via the nozzle portion.

20. The method of claim 16, wherein the food product is cream to be dispensed as whipped cream.

* * * * *